US008141781B2

(12) United States Patent
Oliva et al.

(10) Patent No.: US 8,141,781 B2
(45) Date of Patent: Mar. 27, 2012

(54) LASER LIGHT BEAM SCANNING DEVICE FOR READING CODED INFORMATION AND SCANNING OPTICAL ELEMENT FOR SUCH DEVICE

(75) Inventors: Guido Maurizio Oliva, Rovigo (IT); Donato Vincenzi, Cento (IT); Paolo Quattrini, Padulle (IT)

(73) Assignee: Datalogic Scanning Group S.r.l., Lippo di Calderara di Reno (BO)

( * ) Notice: Subject to any disclaimer, the term of this patent is extended or adjusted under 35 U.S.C. 154(b) by 153 days.

(21) Appl. No.: 12/521,222

(22) PCT Filed: Dec. 29, 2006

(86) PCT No.: PCT/IT2006/000880
§ 371 (c)(1),
(2), (4) Date: Nov. 11, 2009

(87) PCT Pub. No.: WO2008/081481
PCT Pub. Date: Jul. 10, 2008

(65) Prior Publication Data
US 2010/0051797 A1    Mar. 4, 2010

(51) Int. Cl.
*G06K 7/14* (2006.01)
(52) U.S. Cl. ................................... 235/454; 235/462.25
(58) Field of Classification Search .................. 235/454, 235/455, 462.14, 462.17, 462.25
See application file for complete search history.

(56) References Cited

U.S. PATENT DOCUMENTS

| | | | |
|---|---|---|---|
| 4,387,297 A | 6/1983 | Swartz et al. | |
| 4,902,083 A | 2/1990 | Wells | |
| 5,367,151 A | 11/1994 | Dvorkis et al. | |
| 5,559,319 A | 9/1996 | Peng | |
| 5,786,585 A | 7/1998 | Eastman et al. | |
| 5,900,617 A | 5/1999 | Dvorkis et al. | |
| 5,907,145 A | 5/1999 | Krichever et al. | |
| 5,917,173 A | 6/1999 | Dvorkis et al. | |
| 6,145,743 A * | 11/2000 | Dvorkis et al. | 235/462.01 |
| 6,712,270 B2 * | 3/2004 | Leach | 235/454 |
| 6,929,184 B2 * | 8/2005 | Barkan | 235/462.25 |
| 7,296,743 B2 * | 11/2007 | Giebel et al. | 235/454 |

FOREIGN PATENT DOCUMENTS
EP    0344882 A2    12/1989
EP    0660255 A    6/1995

OTHER PUBLICATIONS

International Search Report from PCT/IT2006/000880 dated Aug. 21, 2007.

* cited by examiner

*Primary Examiner* — Daniel St.Cyr
(74) *Attorney, Agent, or Firm* — Duane Morris LLP

(57) ABSTRACT

A laser light beam scanning device for reading coded information includes an emission source of a laser light beam, an optical element for scanning the laser light beam on a support containing coded information, an optical element for collecting the light coming from the support and photodetector means sensitive to the light collected by the collecting optical element so as to generate a representative signal of the information contained in the support. The collecting optical element is spatially distinct from, and integrally oscillating with, the scanning optical element and includes at least one transmissive input surface of the light coming from the support. In particular, the scanning optical element and the collecting optical element are part of a single scanning and light collecting optical element.

26 Claims, 36 Drawing Sheets

Fig. 1

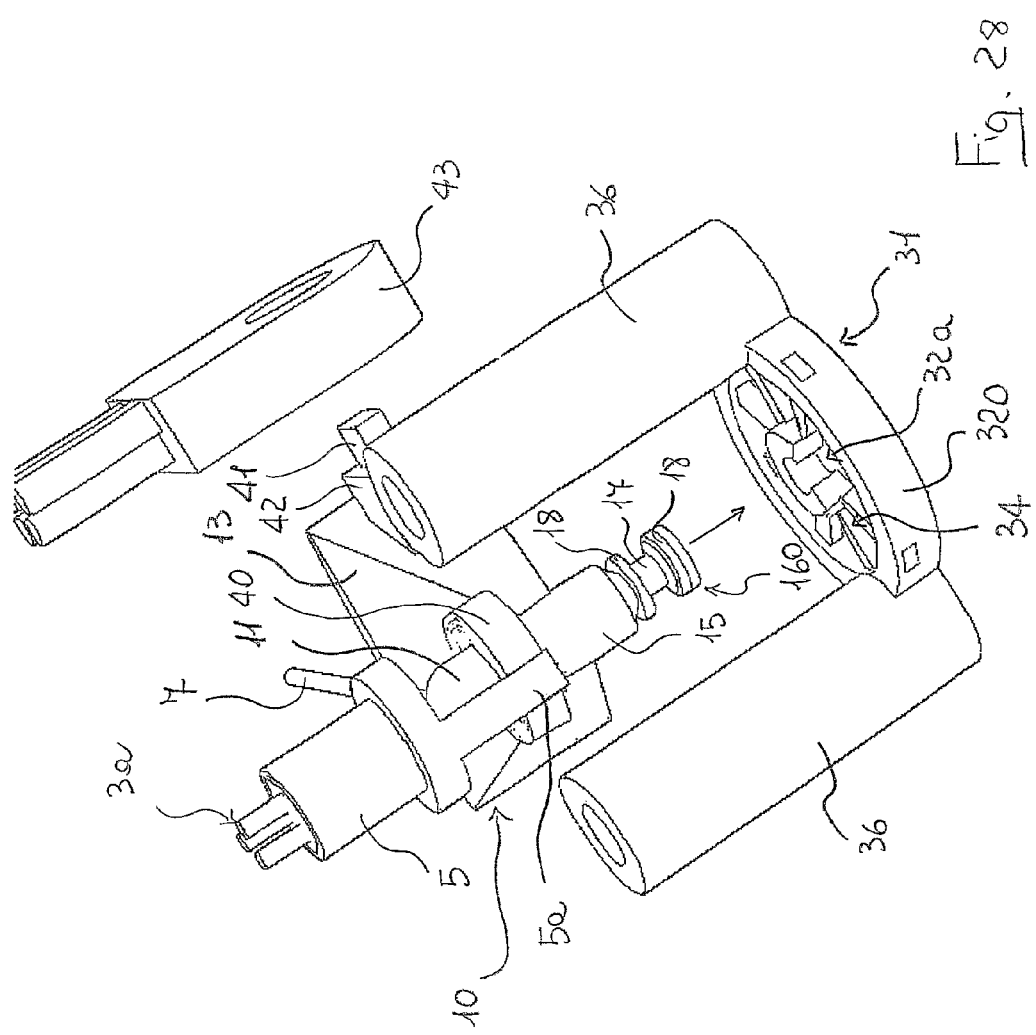

LASER LIGHT BEAM SCANNING DEVICE FOR READING CODED INFORMATION AND SCANNING OPTICAL ELEMENT FOR SUCH DEVICE

FIELD OF THE INVENTION

The present invention relates to a laser light beam scanning device for reading coded information. In particular, the invention relates to a scanning device of oscillating type used for reading optical codes.

The invention also relates to an optical element which can be used in such a device for scanning a laser light beam on a support containing coded information and for collecting the light diffused or reflected from the illuminated support. The invention also relates to a reader of coded information comprising the aforementioned device.

BACKGROUND OF THE INVENTION

Throughout the present description and the subsequent claims, with the term "reader of coded information" it is intended to indicate any device capable of acquiring information related to an object (for example, distance, volume, size or identifying data thereof) by acquiring and processing a light signal diffused or reflected from the same object. With the term: "coded information" it is intended to indicate the whole data contained in an optical code. With the term: "optical code" it is intended to indicate any graphical representation having the function of containing coded information. A particular example of optical code consists of linear or two-dimensional codes, wherein the information is codified by means of appropriate combinations of elements having a predetermined shape, for example squares, rectangles or hexagons, of dark colour (normally black) separated by clear elements (spaces, normally white), such as bar codes, stacked codes and two-dimensional codes in general, colour codes etc. The term "optical code" moreover comprises, more in general, also other graphical forms with information coding function, including printed characters (letters, numbers, etc.) and particular patterns (such as for example stamps, logos, signatures, fingerprints etc.). The term "optical code" moreover comprises graphical representations which can be detected not only in the visible light field but also in the entire range of wavelengths between the infrared and the ultraviolet.

Only for exemplificative purpose and in order to make the following description clearer, explicit reference will often be made hereinafter to a bar code reader (linear reader); of course, a person skilled in the art will recognize that what said is applicable to readers of different type, such as for example "stacked"-type two-dimensional optical code readers.

Furthermore, reference will often be made to the "light diffused" from a support containing an optical code, generally intending with this expression the light coming from the illuminated optical code, and therefore also the "light reflected" directly by the illuminated optical code.

As it is known, a laser scanner device for reading an optical code typically comprises, in the simplest configuration thereof, an emission source of a laser light beam, a scanning optical element of said laser light beam on a support containing the optical code to be read, a collecting system of the light diffused by the illuminated optical code and a photoreceiver which is sensitive to the light diffused by the illuminated optical code in order to generate a photoelectric signal whose time modulation represents the information contained in the optical code.

The prior art scanning devices are typically of rotating or oscillating type, depending on the type of motion which the scanning optical element is subjected to.

With particular reference to the scanning devices of oscillating type, those known in the prior art are generally based on optical systems of retroreflective or semiretroreflective type. Such devices provide in particular for the use of an oscillating mirror which acts both as scanning optical element of the laser light beam on the optical code and as collecting element of the light diffused by the illuminated optical code, such light being then directed towards the photoreceiver.

Actually, scanning devices of oscillating type are also known, wherein the scanning of the laser light beam is obtained by directly placing in oscillation the emission source and/or the photoreceiver, and the focusing and collecting lenses associated therewith. Such devices, however, have the drawback of requiring movable connections in order to allow controlling the laser source and/or extracting the photoelectric signal from the photoreceiver.

Coming back to the scanning devices which use an oscillating mirror, such mirror is generally put into motion by a brushless or galvanometric electromagnetic motor, or by a bimorph resonant motor, as for example described in U.S. Pat. No. 4,387,297. It is also known to move the oscillating mirror by means of a resonant motor which uses a planar spring in mylar or other non-metallic material, such as for example described in U.S. Pat. No. 5,917,173, U.S. Pat. No. 5,900,617 and U.S. Pat. No. 5,367,151.

The scanning devices of oscillating and retroreflective type further comprise, typically, in addition to the mirror for scanning and collecting the light, a deflecting mirror for deflecting outwards the laser beam emitted by the emission source and a further collecting and deflecting mirror for deflecting towards the photoreceiver the light diffused by the illuminated optical code. The Applicant observes that the use of a deflecting mirror of the light emitted by the emission source and of a deflecting mirror towards the photoreceiver of the light diffused by the illuminated optical code requires making two additional mirror-like elements (in addition to the mirror for scanning and collecting the light), i.e. elements having surfaces with metal treatment which require a costly and hard-to-control deposition process. Moreover, the deflecting mirror of the light emitted by the emission source constitutes an obstruction in the optical collection path of the light diffused by the illuminated code. All of this implies an increase of the manufacturing costs of this additional mirror-like element and a complication of the structure configuration and of the layout of the device, due to the need to particularly take care of the positioning of the two separate mirror-like elements. Such a complication becomes even greater the more one wishes to miniaturise the device.

The Applicant further observes that, in most of the currently known solutions, a metal or plastic frame which houses all of the mechanical and optical components is provided. The structure of such frame is particularly complex and its manufacturing requires very accurate and expensive moulds, in order to ensure the correct mutual positioning of the components.

The technical problem at the basis of the present invention is that of identifying a structural and layout configuration for a scanning device of oscillating type which allows reducing to a minimum or even eliminating the size of the required mirror-like surface, thus saving on the manufacturing cost of the device, and which allows miniaturising the device as much as possible, simplifying as much as possible the optical collection path.

SUMMARY OF THE INVENTION

The present invention therefore relates, in a first aspect thereof, to a scanning device of a laser light beam for reading coded information, comprising:
- an emission source of a laser light beam;
- an optical element for scanning the laser light beam on a support containing coded information;
- an optical element for collecting the light coming from said support;
- photodetector means which are sensitive to the light collected from the collecting optical element, to generate a signal representative of the information contained in said support;

characterised in that the collecting optical element comprises at least one transmissive input surface of the light coming from said support and in that the scanning optical element and the collecting optical element are spatially distinct and integrally oscillating around an oscillation axis X-X.

In the scanning device of the present invention, thus, the collection of the light diffused or reflected by the illuminated optical code for the subsequent detection step is carried out by an optical element having a transmissive input surface, i.e. a surface which does not reflect the light coming from the optical code. Such element is spatially distinct from the optical element which carries out the scanning of the laser light beam on the optical code to be read but it is intended to oscillate integrally with it, such that at each rotation of the scanning optical element there corresponds an equal rotation of the light collecting optical element and of the scanned laser beam. Advantageously, the emission and collection fields of view are therefore substantially parallel. The device of the present invention can be therefore classified in the class of nearly retroreflective-type devices, since the optical collection path is separated from the emission path but the respective fields of view are substantially overlapped.

Throughout the present description and in the following claims, the expression 'spatially distinct' is used to indicate a different position in space of one element with respect to another element, such elements being either physically apart (i.e. separated from each other), or integral parts of a single element.

Even more advantageously, since the optical paths are separated, in the device of the present invention it is not necessary to provide any deflecting mirror in the optical collection path (unlike the devices of oscillating type described above with reference to the prior art). The size of the mirror-like surface within the device is therefore limited, with a consequent savings on the manufacturing cost of the device itself, and any obstruction in the optical collection path is eliminated, thus maximising the light collected by the photodetector means. The absence of deflecting mirrors in the optical path also allows a simplification and a greater miniaturisation of the device.

The collecting optical element can be a refractive optical element or a diffractive optical element. Embodiments of the invention are foreseen in which the collecting optical element does not have any mirror-like surfaces at all.

Preferably, the collecting optical element and the scanning optical element, while being spatially distinct, are part of a single optical element which is rotatable around the oscillation axis X-X.

Throughout the present description and in the subsequent claims, frequent reference will be made to the aforementioned single optical element by using the expression: scanning and light collecting optical element.

Advantageously, the fact that the collecting optical element and the scanning optical element are part of a single optical element permits obtaining a reduction of the number of optical components of the device and therefore a greater optimisation of the spaces inside the same, with the consequent greater possibility to miniaturise the device. Moreover, in the device of the present invention, the precise reciprocal positioning between scanning optical element and collecting optical element is advantageously carried out in the design and manufacturing step of the scanning and light collecting optical element. The assembly of the device of the present invention is therefore much simpler and faster than that of the devices of the prior art in which the scanning element and the additional deflecting and collecting elements are elements which are physically apart. In these devices, in fact, the precise reciprocal positioning between such distinct optical elements can be made only by applying maximum care and attention in the assembly step of the device.

Preferably, the oscillation axis X-X of the scanning and light collection element passes through the centre of mass of such element. The weight of such optical element is therefore balanced with respect to its rotation axis.

Preferably, the scanning and light collecting optical element comprises a body having a first body portion adapted to act on the light beam emitted by the emission source and so shaped to direct said light beam towards the support containing the coded information along an optical emission path and at least one second body portion, spatially distinct from said first body portion, adapted to act on the light which is diffused or reflected from said support and so shaped to collect such light on the photodetector means along an optical collection path.

The device of the present invention preferably comprises a PCB which supports the emission source, the aforementioned single optical element and the photodetector means. More preferably, in the operating position of the device of the present invention, the PCB is arranged on the upper part of the aforementioned components. Advantageously, in a preferred embodiment, all the components constituting the device of the invention are fixed to a single PCB; every other mechanical support is therefore eliminated. This contributes to the optimisation of the spaces inside the device and leads to a simplification of the assembly and disassembly operations of the same. A structure of such a type is moreover particularly adaptable for integration into a manual reader of optical codes.

Preferably, the aforementioned first body portion is extended coaxially with the oscillation axis X-X and comprises a first surface which is tilted at an angle different from 90° with respect to the axis X-X. More preferably, such angle is substantially equal to 45°, so that the light beam emitted by the emission source is deflected from the aforementioned surface by substantially 90° to be directed towards the surface containing the coded information.

In a first embodiment of the device of the present invention, the aforementioned first surface is a mirror-like surface adapted to receive the light emitted by said emission source. Such surface can therefore constitute the only mirror-like surface provided inside the device of the present invention. The dimensions of such mirror-like surface must only be slightly greater than the dimensions of the section of the emitted laser beam. The savings on the manufacturing cost of the device itself when compared to the devices of the prior art are therefore evident.

In a preferred embodiment of the device of the present invention, the aforementioned first surface is instead an internal surface of a prism working via total internal reflection, defined in the aforementioned first body portion. In this embodiment, advantageously, the device of the invention may not comprise any mirror-like surface, with a consequent savings on the manufacturing costs of the device itself.

Preferably, irrespective of the specific embodiment of the device of the present invention, the scanning and light collecting optical element is made of plastic. In this manner an overall reduction of the device weight is obtained.

In the preferred embodiment of the device of the present invention, the aforementioned at least one second body portion defines, in said transmissive surface, a lens having a collecting face of the light diffused by said support and a focus at an end of said at least one second body portion opposite said light collecting face. More preferably, the aforementioned at least one second body portion is extended cantilevered from the first body portion along a lying plane which is tilted, preferably at about 90°, with respect to the oscillation axis X-X. The physical separation between the body portion adapted to carry out the scanning of the laser light beam on the optical code to be read and the body portion adapted to collect the light diffused by the illuminated optical code to direct it towards the photodetector means is thus achieved.

Preferably, the oscillation axis X-X crosses the second body portion close to an end thereof opposite the light collecting face and thus upstream of the aforementioned focus along the optical collection path. In this manner, advantageously, by positioning the photodetector means immediately downstream, along the optical collection path, of the end of the second body portion opposite the aforementioned collecting face, the image formed on the photodetector means remains substantially stationary during the rotation of the light scanning and connecting optical element, thus maximising the quantity of light collected by the photodetector means. It is further possible to use, as photodetector means, a single commercial photodiode of standard size, like 1-2 mm², thus ensuring the desired characteristics of compactness, simplicity and savings on the overall cost of the device.

Preferably, the device of the present invention further comprises an anchoring structure of the scanning and light collecting optical element to the PCB.

In the preferred embodiment, the scanning and light collecting optical element comprises a third body portion extended coaxially with the X-X oscillation axis on the side opposite the aforementioned first body portion with respect to the aforementioned at least one second body portion and the anchoring structure comprises a first support element associated with the scanning and light collecting optical element at the first body portion and a second support element associated with the scanning and light collecting optical element at the aforementioned third body portion, the first and the second support element being reciprocally associated.

Preferably, the aforementioned first body portion is rotatably associated with the first support element and the aforementioned third body portion is rotatably associated with the second support element.

In the preferred embodiment thereof, the device of the present invention further comprises damping means operatively interposed between the scanning and light collecting optical element and the anchoring structure. Advantageously, the damping means act as protection for the optical elements of the device in the case of strong mechanical shocks, in particular in the case of vertical stresses.

The device of the present invention further comprises, in the preferred embodiment thereof, a resonant element associated with the scanning and light collecting optical element and means of excitation of such resonant element. The resonant element and the excitation means advantageously allow achieving the oscillation of the scanning and light collecting optical element around the oscillation axis X-X.

Preferably, also the aforementioned excitation means are directly or indirectly associated with the same PCB to which the other components of the device of the present invention are associated.

Preferably, the resonant element comprises a spring having a first end associated with the scanning and light collecting optical element and a second end associated with the aforementioned anchoring structure, while the excitation means comprise a permanent magnet and an electric winding (or coil). The orientation of the magnetization axis of the magnet and the axis of the coil can be different, as is better described below.

In a first specific embodiment of the device of the present invention, the permanent magnet is housed in a seat formed in the scanning and light collecting optical element. Preferably, such seat is provided on the side opposite the aforementioned second body portion with respect to the oscillation axis X-X. A variant is in any case foreseen in which the permanent magnet is directly associated with the resonant element. A further variant is moreover foreseen in which the coil is associated with the scanning and light collecting optical element and the resonant element, which in the specific case is a planar spring, comprises two elements which are electrically isolated from each other and adapted to oscillate synchronously.

In a variant of the device of the present invention, the resonant element comprises two counteracting elastic elements. Two counteracting springs are used in particular. Alternatively, in place of the two counteracting springs, use can be made of a single, appropriately shaped spring, as will be better described below.

In an embodiment thereof, the device of the present invention comprises a counterweight element associated with the scanning and light collecting optical element and extended on the side opposite the second body portion with respect to the oscillation axis X-X to balance the device with respect to the oscillation axis X-X. Such solution allows attaining, advantageously, a greater balancing of the optical element and a more precise alignment with regard to the various components of the device with such optical element.

In this embodiment, preferably, the permanent magnet is associated with the counterweight element.

In the preferred embodiment of the device of the present invention, the photodetector means and the coil are associated with the aforementioned anchoring structure.

Preferably, the photodetector means comprise a through-hole photodiode. Such photodiode, advantageously, can be associated with an upper PCB.

Preferably, the device of the present invention further comprises a focusing lens arranged in the optical emission path between the emission source and the scanning and light collecting optical element and a barrel for housing the emission source and the focusing lens. The use of such barrel allows easily obtaining a precise alignment between the emission source and the focusing lens.

Preferably, the aforementioned barrel, and therefore also the focusing lens, is supported by the PCB by means of the emission source.

In a specific embodiment thereof, the device of the present invention can further comprise a beam concentrator element interposed between the scanning and light collecting optical element and the photodetector means. Such beam concentrator element advantageously permits, if the effective displacement of the light spot on the photodetector means caused by the oscillation of the scanning and light collecting optical element is excessive, to reduce such displacement in a significant manner, such that the spot can always remain focused on the photodetector means.

The photodetector means can be arranged along the optical collection path downstream of the scanning and light collecting optical element, such that the optical collection path is substantially linear or otherwise such that the optical collection path comprises at least two sections which are tilted with respect to each other. In the latter case, the scanning and light collecting optical element comprises a second surface tilted by an angle different from 90° with respect to the axis X-X. More preferably, such angle is substantially equal to 450, such that the optical collection path is deflected by substantially 90° and that a portion of the optical collection path is substantially coaxial with the axis X-X. In this case, the photodetector means are arranged coaxially with the oscillation axis X-X. The advantages deriving from this embodiment are correlated with the fact that the light beam focused on the photodetector means does not translate during the oscillation of the scanning and light collecting optical element, but only undergoes a rotation.

The aforementioned second surface can be a mirror-like surface, but a preferred embodiment of the present invention is foreseen in which the aforementioned second surface is an internal surface of a prism working via total internal reflection, defined in the aforementioned third body portion. Using a prism working via total internal reflection instead of a mirror-like surface allows savings on the device manufacturing costs, as already stated above with reference to the surface adapted to direct the light beam from the emission source towards the optical code to be read.

In a second aspect thereof, the invention relates to an optical reader for the reading of coded information, comprising a scanning device of the above-described type. Such a reader can be either a manual reader or a fixed reader.

Advantageously, the aforementioned reader, comprising the scanning device of the present invention, has all of the advantageous aspects described above with reference to such a scanning device.

Preferably, the aforementioned reader comprises individually and/or in combination all of the structural and functional characteristics (these being essential, preferred and/or advantageous characteristics) described above with reference to the scanning device of the present invention.

In a third aspect thereof, the invention relates to a scanning and light collecting optical element comprising a body extended along an axis X-X and having a first body portion so shaped to direct an incident light beam towards a support containing coded information and a second body portion spatially distinct from said first body portion and so shaped to collect the light coming from said support so as to direct it towards photodetector means, wherein said body comprises at least one transmissive input surface of the light coming from said support.

Advantageously, such an optical element can be used in a scanning device of the type described above and allows obtaining the advantages mentioned above with reference to such scanning device.

Preferably, the optical element described above comprises individually and/or in combination all of the structural and functional characteristics (these being essential, preferred and/or advantageous characteristics) described above with reference to the scanning and light collecting optical element of the scanning device of the present invention.

In particular, the optical element can be a refractive or diffractive element, or an element which does not have any mirror-like surfaces at all.

Preferably, the first body portion of the scanning and light collecting optical element is extended coaxially with the axis X-X and comprises a first surface tilted at an angle different from 90°, and preferably equal to about 45°, with respect to the axis X-X.

The aforementioned first surface can be a mirror-like surface or otherwise an internal surface of a prism working via total internal reflection defined in the first body portion of the optical element.

Preferably, the body of the scanning and light collecting optical element is made of plastic.

Preferably, the aforementioned second body portion defines, in said transmissive surface, a lens having a collecting face of the light coming from said support and a focus at one end of said second body portion opposite the aforementioned light collecting face.

Preferably, the second body portion is extended cantilevered from the first body portion along a lying plane which is tilted with respect to the axis X-X.

More preferably, the axis X-X crosses the second body portion close to said end opposite the light collecting face.

In the preferred embodiment of the scanning and light collecting optical element of the present invention, said body comprises a third body portion extended coaxially with the axis X-X on the side opposite the first body portion with respect to the second body portion.

The scanning and light collecting optical element can moreover comprise a housing seat of a permanent magnet. Such seat is preferably arranged on the side opposite the aforementioned second body portion with respect to said axis X-X.

In one embodiment of the scanning and light collecting optical element of the present invention, the aforementioned body comprises, between the second body portion and the third body portion, a second surface tilted by an angle different from 90°, and preferably about 45°, with respect to the axis X-X.

The aforementioned second surface can be a mirror-like surface or otherwise an internal surface of a prism working via total internal reflection defined in the aforementioned third body portion.

BRIEF DESCRIPTION OF THE DRAWINGS

Further characteristics and advantages of the present invention will be clearer from the following detailed description of some preferred embodiments thereof, made with reference to the schematic drawings herein enclosed. In such drawings:

FIG. 1 is a perspective and exploded view of an embodiment of a scanning device in accordance with the present invention;

FIG. 15 is a perspective view of a significant portion of an alternative embodiment of the device of the present invention;

FIG. 27 is a front perspective view of a further embodiment of the device of the present invention;

FIG. 28 is a rear perspective view of the device of FIG. 27;

DETAILED DESCRIPTION

Figure 1:
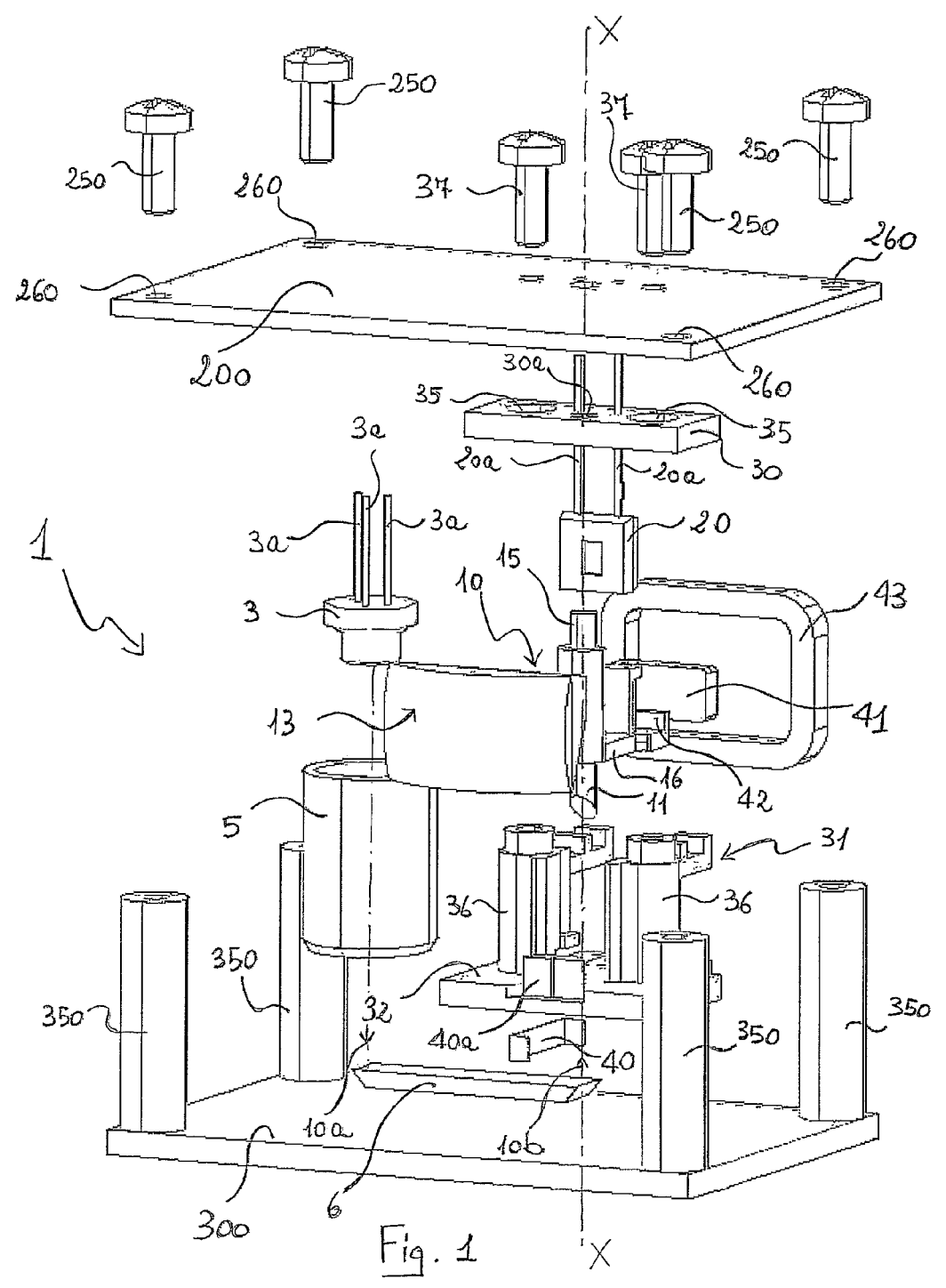
Figure 2:
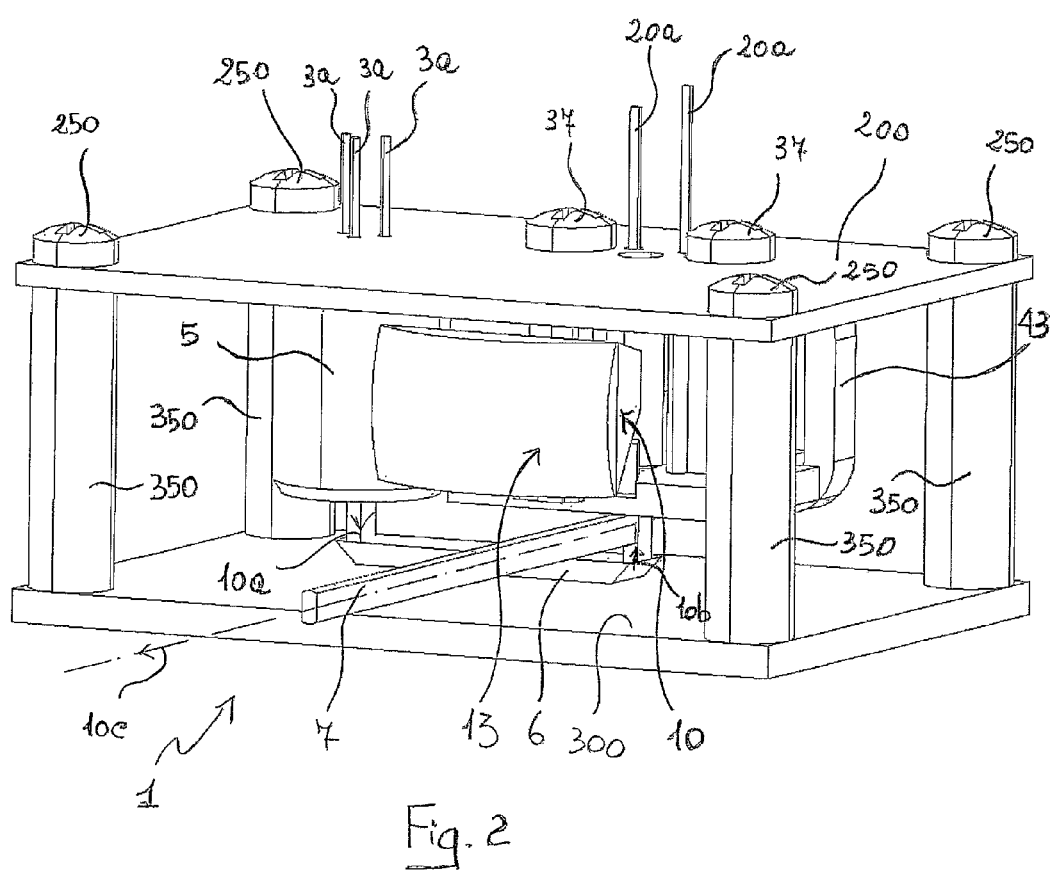
FIG. 2 is a front perspective view of the device of FIG. 1 in assembled state.
Figure 3:
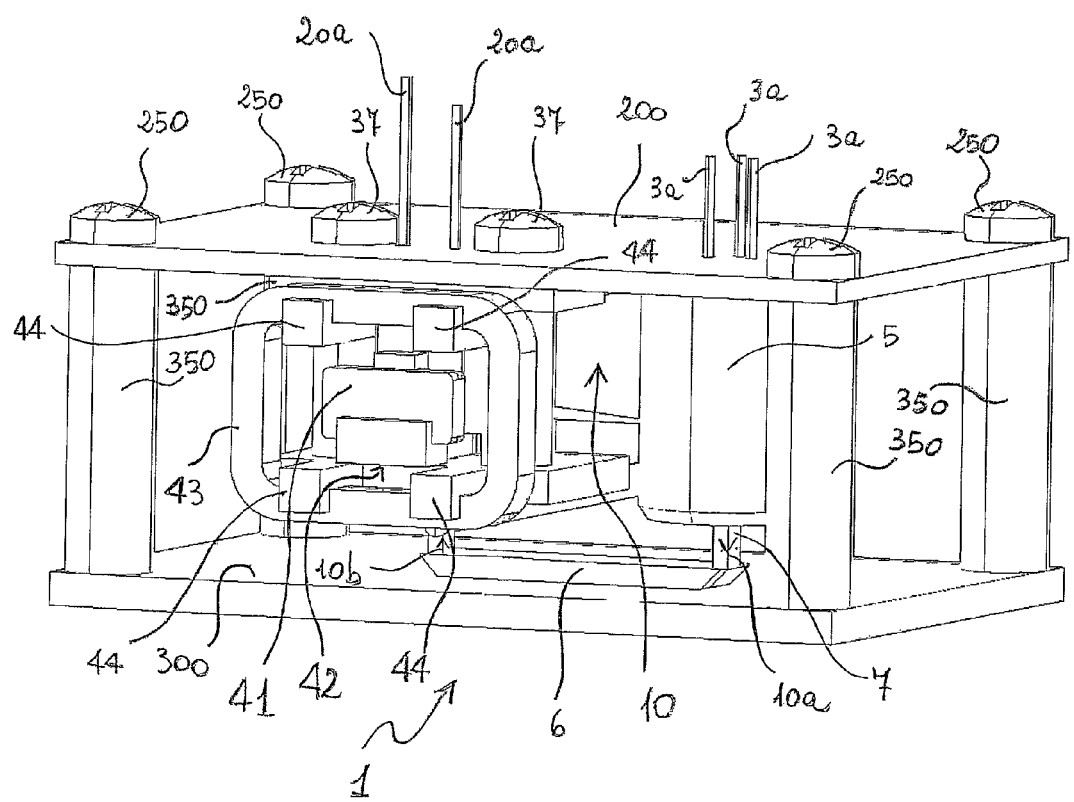
FIG. 3 is a rear perspective view of the device of FIG. 1 in assembled state.

In the FIGS. 1-3 herewith enclosed, with 1 a laser light beam scanning device for reading coded information in accordance with the present invention is indicated.

Figure 30:
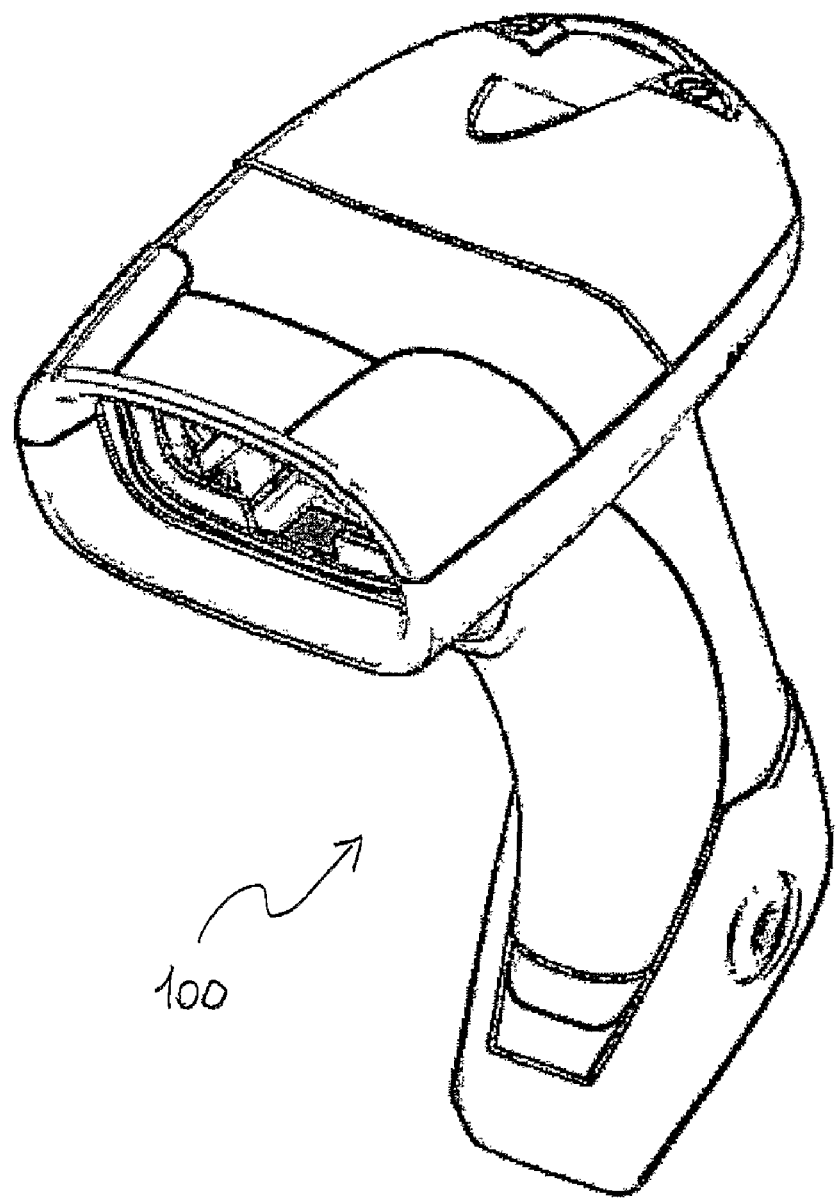
FIG. 30 is a perspective view of a manual reader which incorporates the device of the present invention.

The device 1 is adapted to be mounted inside a reader of optical codes, for example a manual reader 100 illustrated in FIG. 30.

In FIGS. 1-3, it can be seen that, advantageously, all of the components of the device 1, except for the element indicated with 6 and described below, are supported by an upper PCB 200. The mounting of the device 1 in the reader 100 is therefore extremely easy and fast.

The device 1 comprises a plurality of optical and mechanical components, all housed inside a frame constituted by the upper PCB 200 and a lower plate 300. The PCB 200 and the plate 300 are reciprocally associated by means of screws 250 which pass through respective through holes 260 formed on the upper PCB 300 and inserted in appropriate pins 350, provided with internal thread, formed on the lower plate 300.

With particular reference to the specific embodiment thereof illustrated in detail in FIGS. 1-4 and 9-10, the device 1 comprises an emission source 3 of a laser light beam 7, such beam 7 (FIGS. 2, 9 and 10) being emitted along an optical emission path 10a (FIGS. 1, 2, 9 and 10). The emission source 3 can be for example a semiconductor diode laser or a VCSEL.

In the operating configuration of the device 1, the emission source 3 is associated on the lower part of the PCB 200 by means of its leads 3a and is arranged in such a manner that the light beam 7 emitted by the source 3 is substantially vertical.

Downstream of the emission source 3, in, the optical emission path 10a, and therefore below the source 3 in the operating configuration of the device 1, a focusing lens 4 for the light beam is provided. Such lens is visible in particular in FIG. 9.

Figure 9:
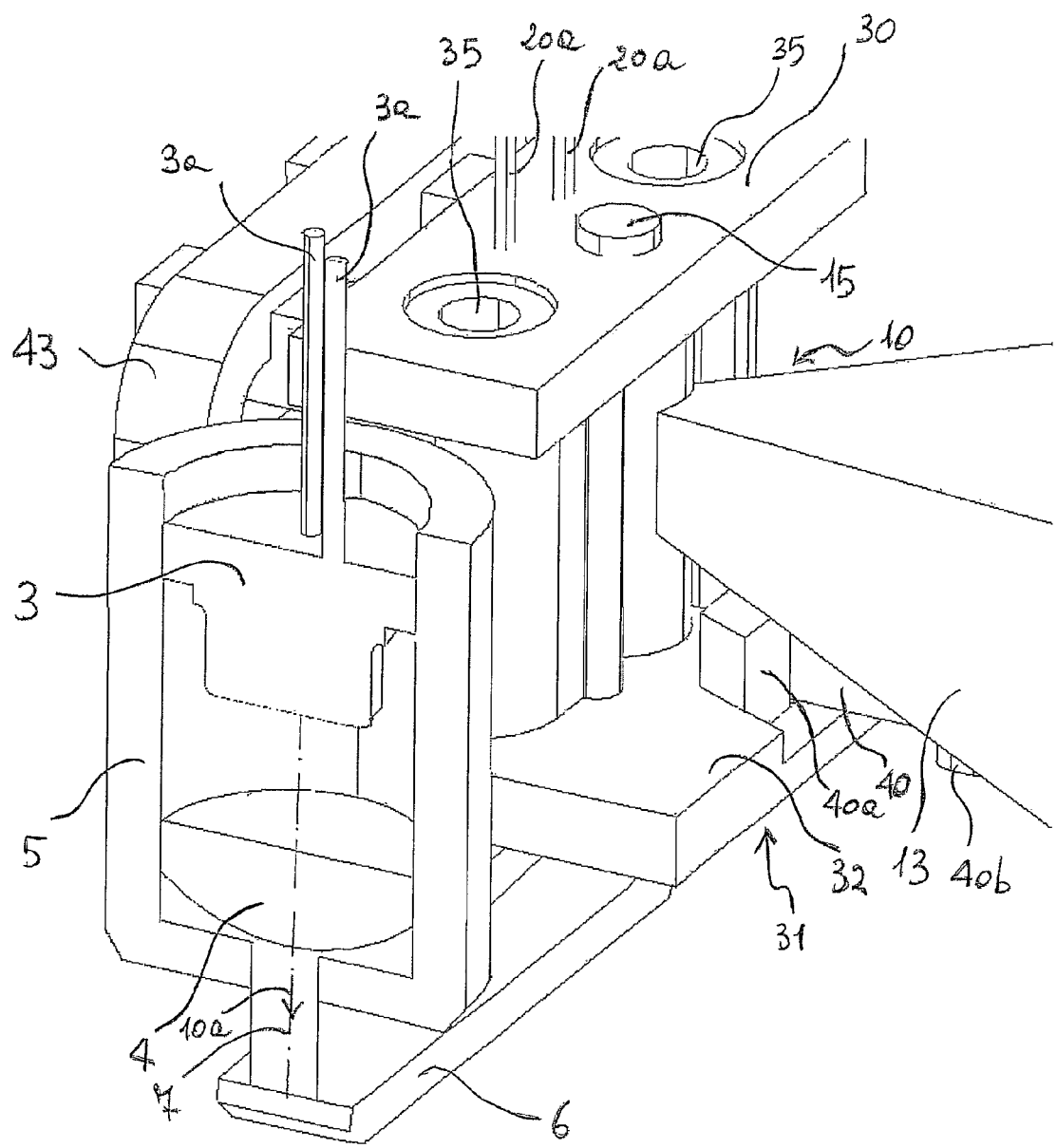
FIG. 9 is a side perspective view of a portion of the device of FIG. 1 with the optical emission system of the light beam highlighted and partially in section.

The emission source 3 and the lens 4 are inserted by interference and from opposite sides in a barrel 5, which in FIG. 9 is illustrated partially sectioned to facilitate the identification of the emission source 3 and lens 4 at its interior. In particular, the emission source 3 is inserted in the barrel 5 by a free end thereof and is held in the barrel 5 either by the interference of the lens edges or by any sealing element of conventional type (not illustrated), such as for example a cut washer or a Teflon spacer or a thrust spring.

In practice, the barrel 5 is supported by the upper PCB 200 by means of the emission source 3 and supports in turn the focusing lens 4.

Downstream of the lens 4, in the optical emission path 10a, a light guide 6 is provided. The light guide 6 is adapted to convey the light beam 7 towards an optical element 10 arranged on the side of the barrel 5. The optical element 10 carries out the scanning of the light beam emitted by the source 3 on an optical code (not illustrated) to be read and collects the diffused or reflected light coming from the illuminated optical code for the subsequent detection step, as will be better described below.

Figure 10:
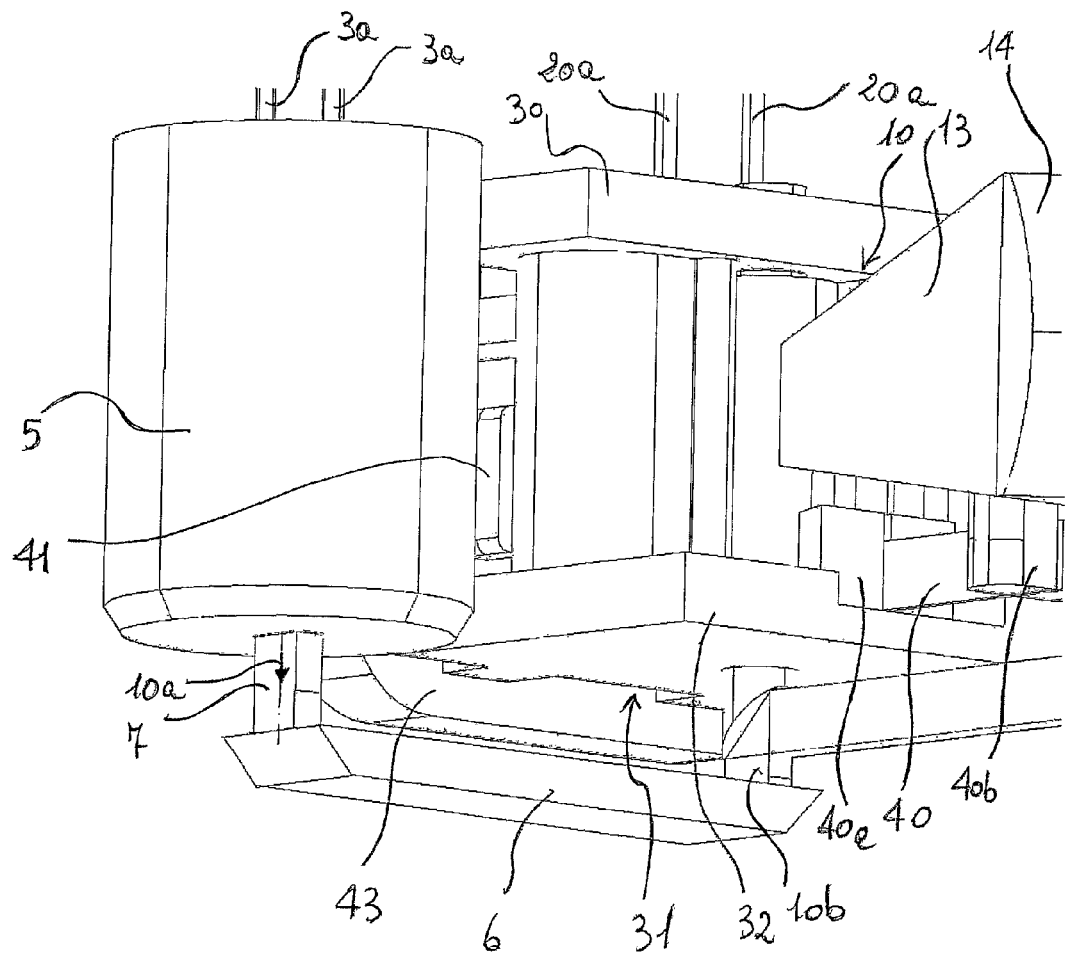
FIG. 10 is a bottom perspective view of the portion of the device of FIG. 1 illustrated in FIG. 9.

The conveying of the light beam 7 towards the optical element 10 occurs, in particular, by means of two internal 900 reflections which occur inside the light guide 6, as illustrated in FIG. 10. The light guide 6 can be associated with the lower plate 300 of the device 1 or it can be made integral with the barrel 5, for example providing suitable reciprocal snap coupling ends in the barrel 5 and in the light guide 6. In this second case all components which constitutes the device 1 (including those described below) are fixed directly or indirectly to the PCB 200. According to a variant, the light guide 6 can be either made integral with the barrel 5 or be fixed to the lower plate 300 so as to avoid misalignments in the case of collisions and falls.

The optical emission path of the light beam 7 has a substantially C-shaped progression between the barrel 5 and the optical element 10. It is thus defined by a first section 10a upstream of the light guide 6 and a second section 10b downstream of the light guide 6. The second section 10b is parallel to the first section 10a (FIGS. 1 and 10).

Figure 4:
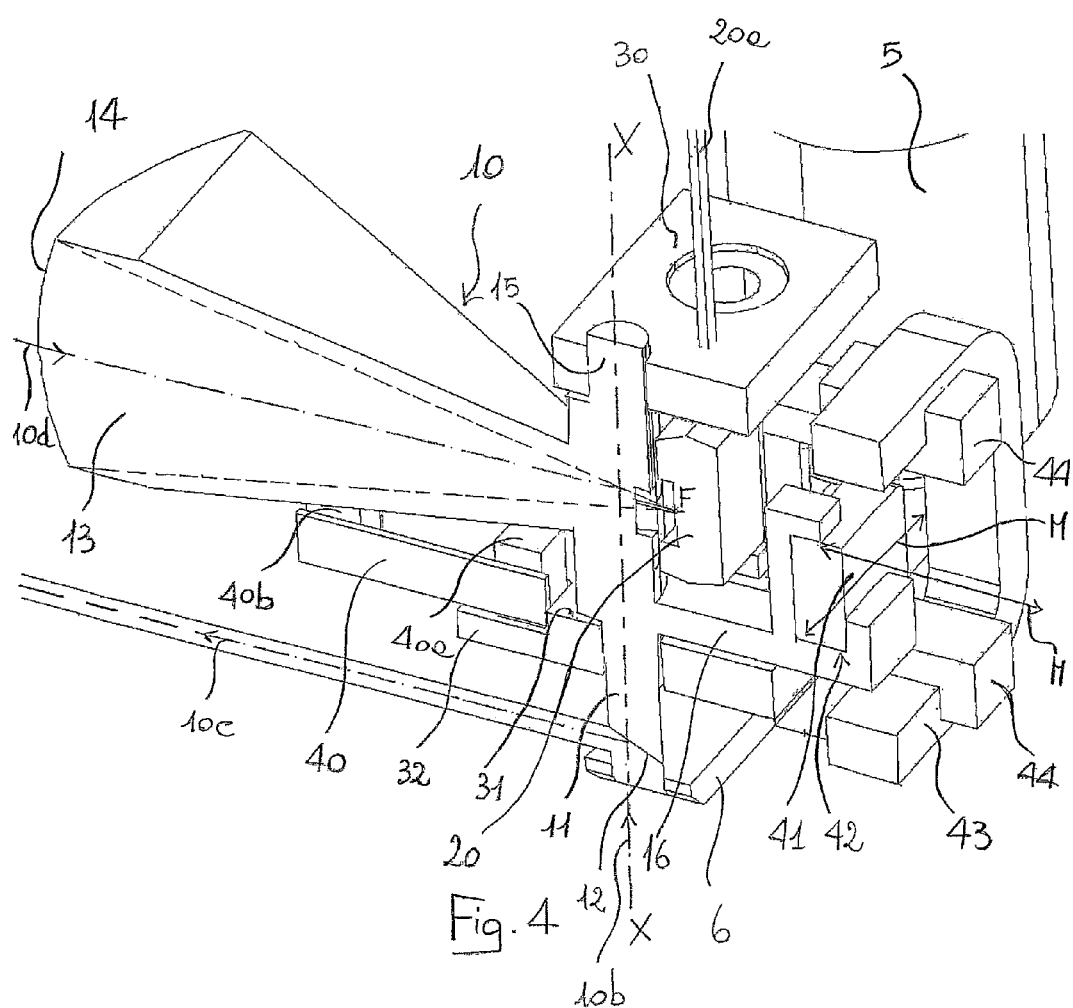
FIG. 4 is a rear perspective view in vertical section of the device of FIG. 1 in assembled state, with a trace of the optical emission path.
Figure 7:
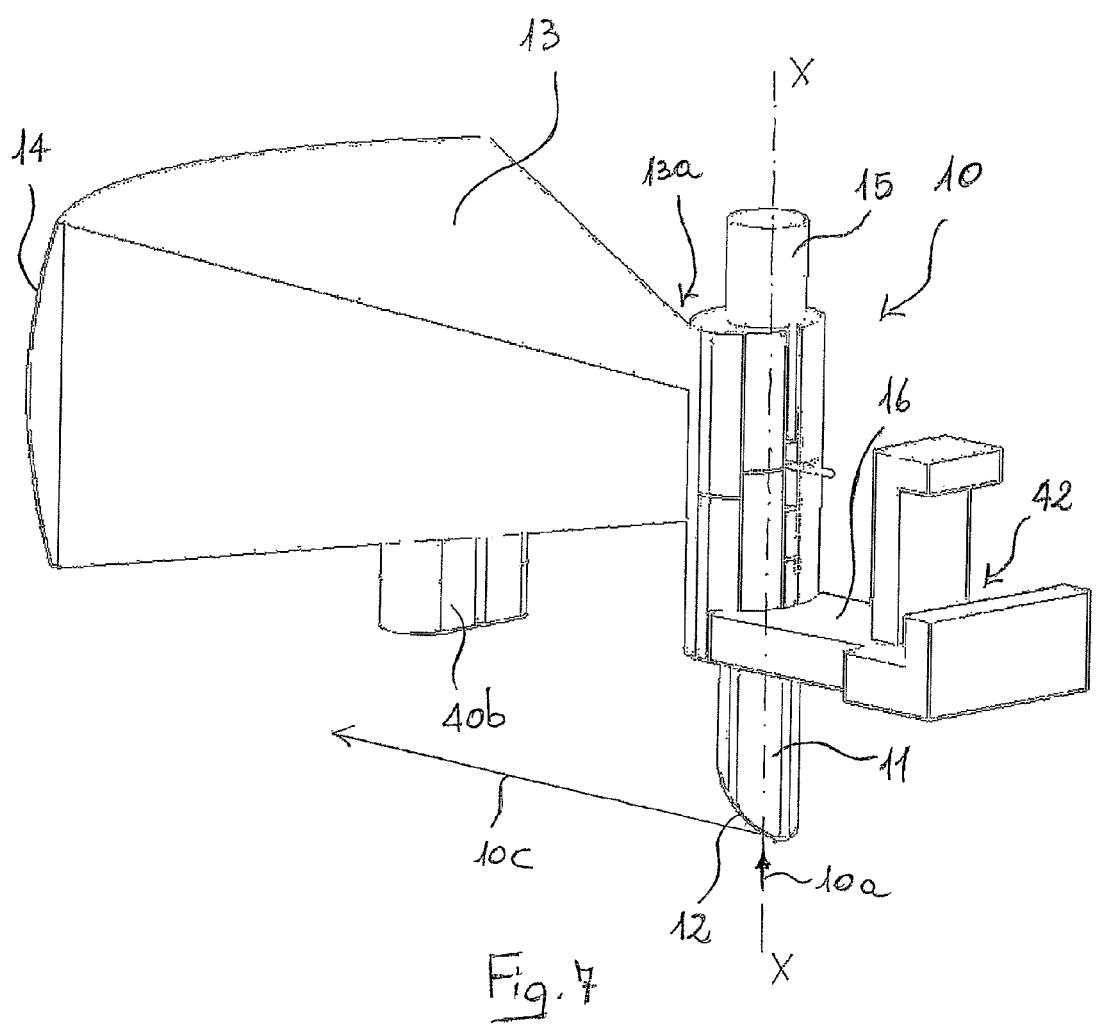
FIG. 7 is a rear perspective view of the optical element of FIGS. 5a, 5b, with a trace of the optical emission path.

The light beam conveyed by the light guide 6 on the optical element 10 is swept by the latter onto the optical code (not illustrated) to be read. Such beam is propagated along an optical emission path 10c (FIGS. 2, 4 and 7). The optical element 10 then collects the diffused or reflected light from the illuminated optical code for the subsequent detection step. The light coming from the illuminated optical code arrives to the optical element 10 along an optical collection path 10d illustrated in FIG. 4 and in FIGS. 5a-5c.

Immediately downstream of the optical element 10, along the optical collection path 10d of the light coming from the illuminated optical code, a photodiode 20 is provided (visible for example in FIGS. 1 and 4). The photodiode 20 receives the light coming from the illuminated optical code, collected in the device 1 by the optical element 10, and generates a photoelectric signal representative of the information contained in the illuminated optical code.

In the preferred embodiment of the device 1 of the present invention, the photodiode 20 is of the through-hole type and is fixed to the PCB 200 by means of its leads 20a (FIGS. 1-4, 9 and 10).

The optical element 10 is capable of oscillating around an oscillation axis X-X, which in the operating configuration of the device 1, is substantially vertical and coincides with the optical axis of the light beam which exits outward from the light guide 6.

The optical element 10 comprises a single body in shaped plastic such that in such body two distinct and functionally separate portions are identifiable. Such portions are respectively adapted to act on the light beam which exits outward from the light guide 6, so as to achieve the scanning on the optical code to be read and to act on the light diffused by the illuminated optical code to collect such light on the photodiode 20.

According to a less preferred variant, the two body portions are respectively, made in distinct bodies, connected with each other by means of appropriate fixing means.

In particular, as shown also in FIGS. 1, 4, 7 and 8, the optical element 10 comprises, a first body portion 11 coaxial with the axis X-X. Such first body portion 11 has a surface 12 facing the output section of the light guide 6 and tilted at an angle of preferably about 45° with respect to the axis X-X. The surface 12 deflects the light beam coming from the light guide 6 by about 90° so as to direct it towards the optical code to be read. The optical emission path is therefore defined by a first section 10a upstream of the light guide 6, a second section 10b downstream of the light guide 6 and upstream of the surface 12 and parallel to the first section 10a, and a third section 10c downstream of the surface 12. The third section 10c is deflected with respect to the second section 10b by an angle substantially equal to 90°.

With the aforementioned structure, it results then that the section 10c of the optical emission path and the optical collection path 10d are substantially parallel to each other.

In the embodiments of the device 1 illustrated in FIGS. 1-4 and 7-10, the surface 12 is treated with a reflecting coating (in particular a metal coating). It is therefore a mirror-like surface.

Figure 12:
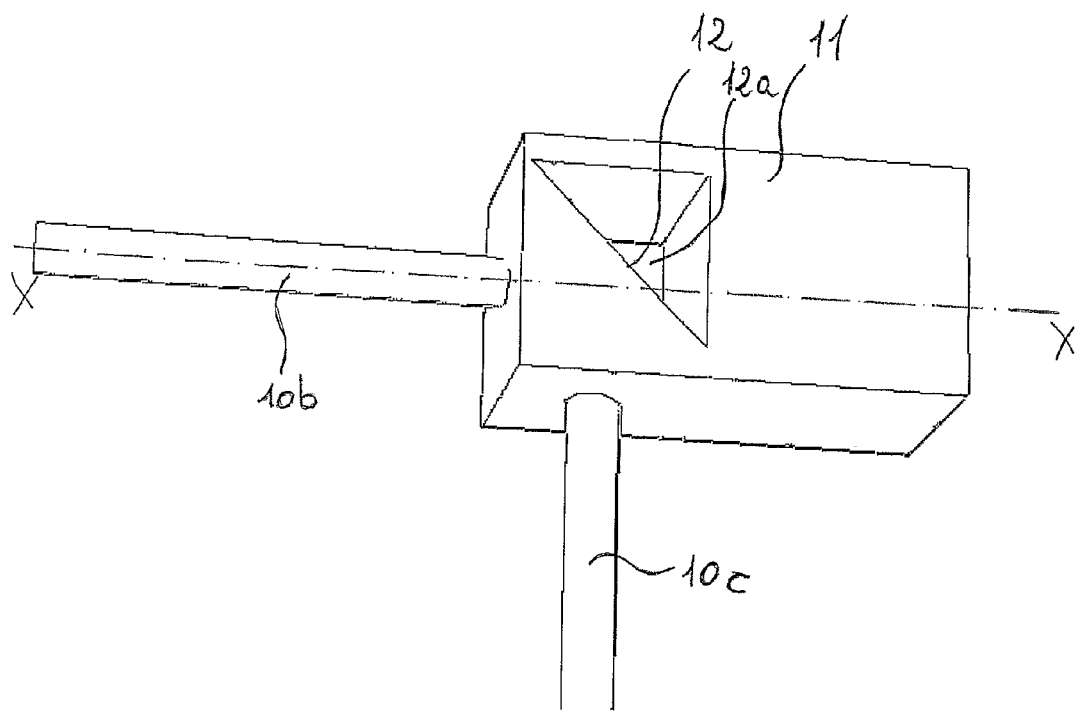
FIG. 12 shows a detail of the optical element of FIG. 5 in an alternative embodiment thereof, with a trace of the optical emission path.
Figure 13:
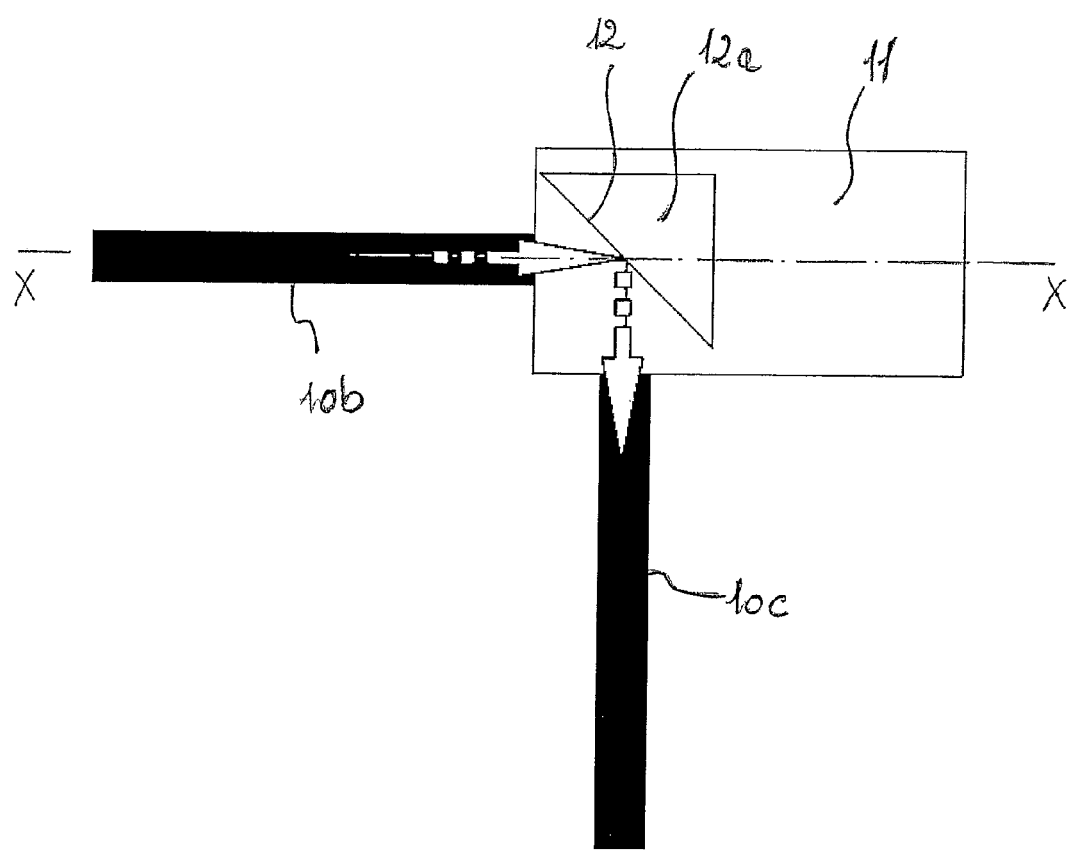
FIG. 13 shows an exemplifying diagram of the operation of the optical element of FIG. 12.
Figure 14:
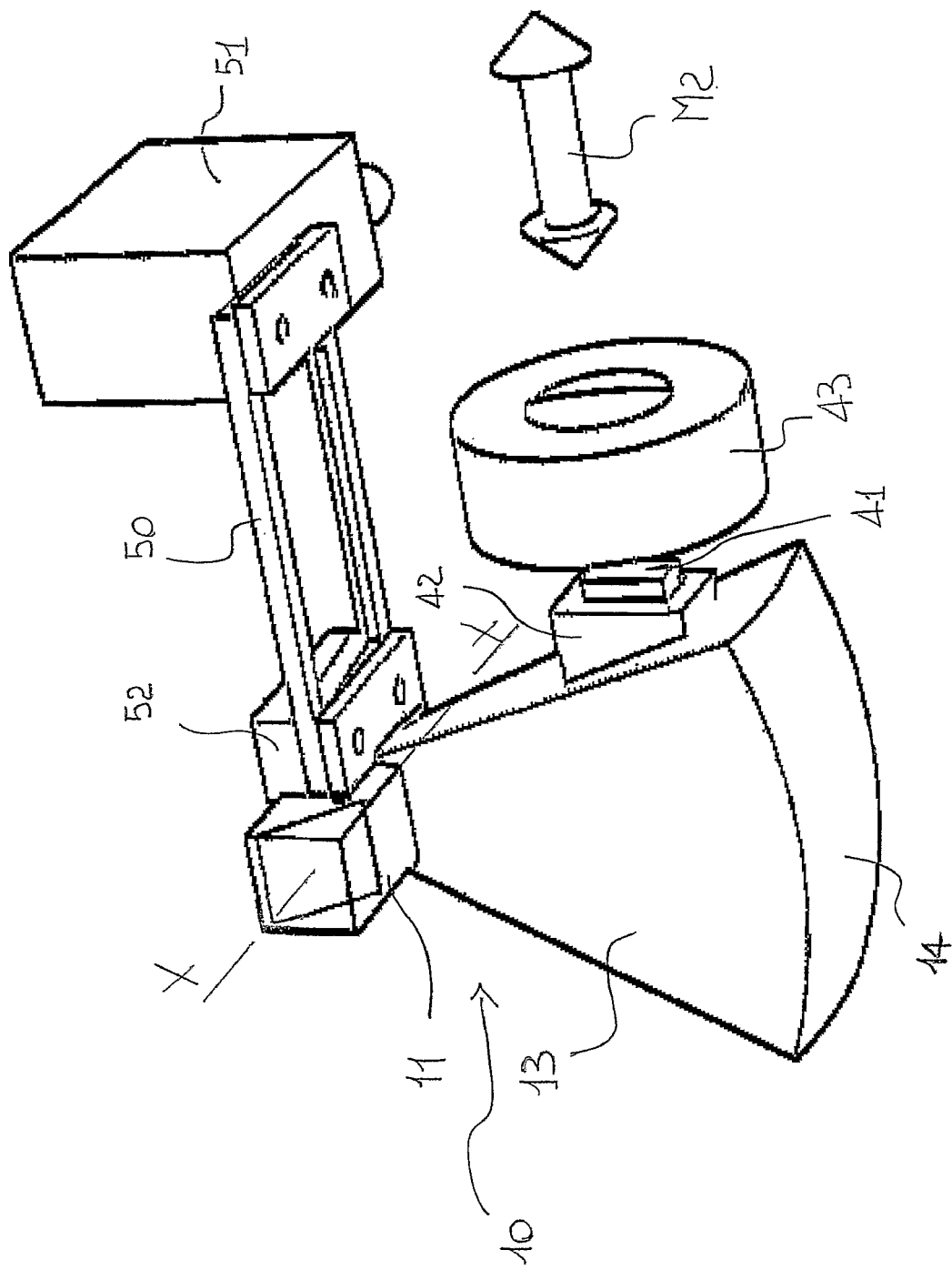
FIG. 14 shows an alternative embodiment of the optical element of the device of the present invention incorporating the detail of FIGS. 12 and 13.
Figure 45:
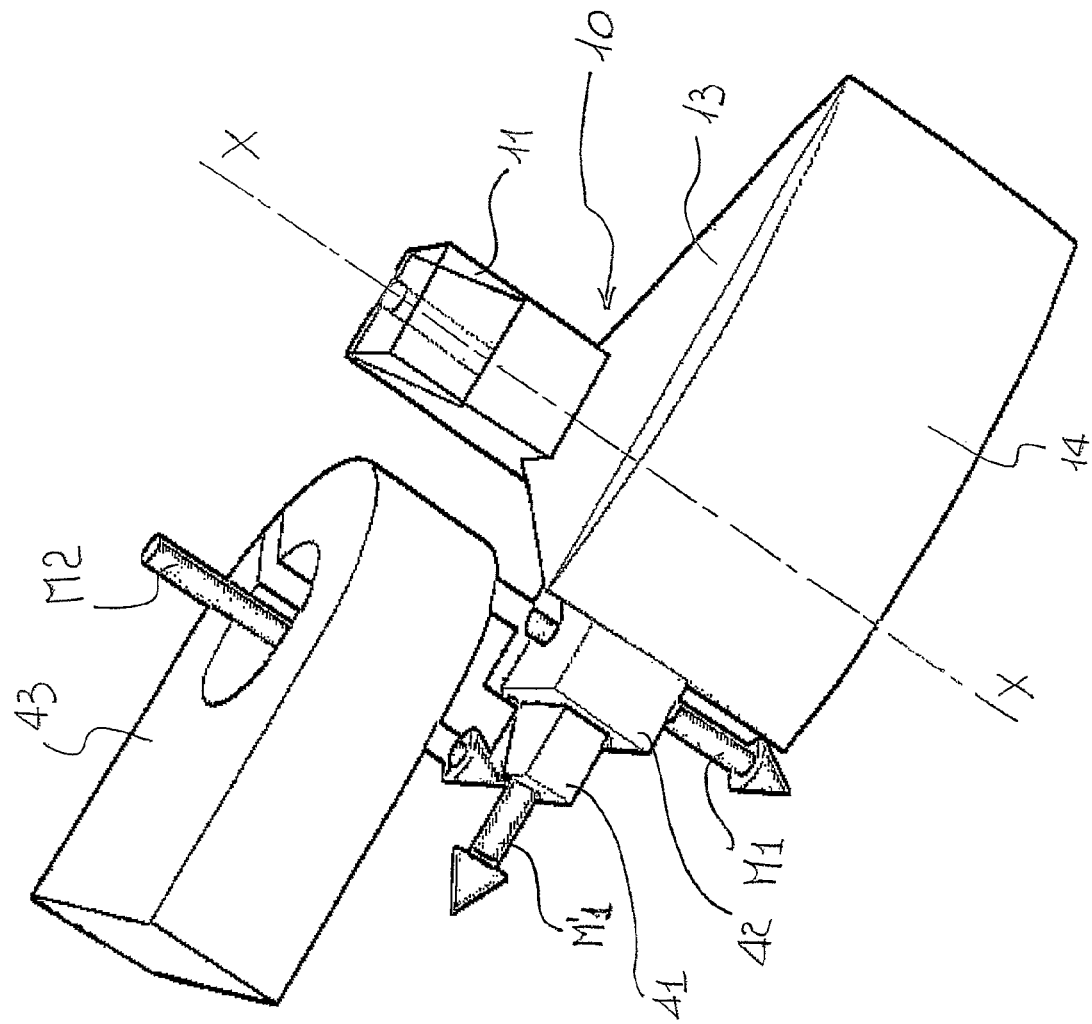

FIG. 14 instead shows an alternative embodiment of the optical element 10 in which the first body portion 11 is so shaped to define a prism which works via internal reflection (see the enlarged detail in FIGS. 12 and 13). In this case, the portion 11 is entirely made in a plastic material and there is no mirror-like surface. The plastic surface 12 is tilted at about 45° with respect to the axis X-X. In the body portion 11, an opening 12a is moreover formed, adapted to ensure a plastic-air interface to achieve the deflection of the optical path from the section 10b to the section 10c. In this manner, one obtains an effect which is absolutely identical to that obtained by means of the use of a reflecting mirror-like surface.

Coming back to the embodiment illustrated in FIGS. 1-4 and 7-10, the optical element 10 further comprises a second body portion 13 which is extended cantilevered from the first body portion 11 along a lying plane which is tilted at 90° with respect to the axis X-X. The second body portion 13 is spatially arranged above the first body portion 11 in the operating configuration of the device 1 and defines a collecting lens for the light diffused by the illuminated optical code (FIGS. 1, 4, 7 and 8).

Figure 5A:
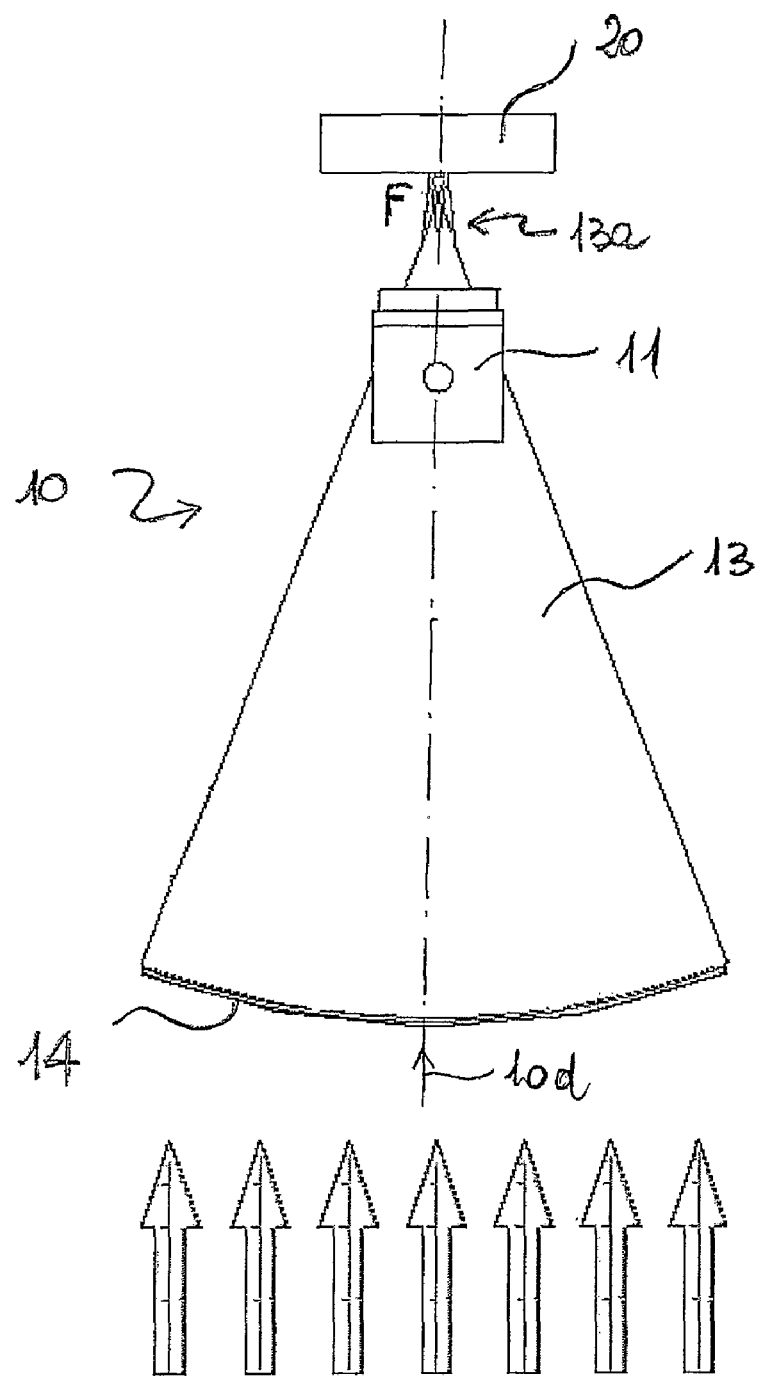
FIGS. 5a, 5b and 5c show in an exemplifying way a scanning and light collecting optical element of the device of FIG. 1 in three operating different positions assumed during the operation of such device, with a trace of the light beam collected by such optical element.
Figure 5B:
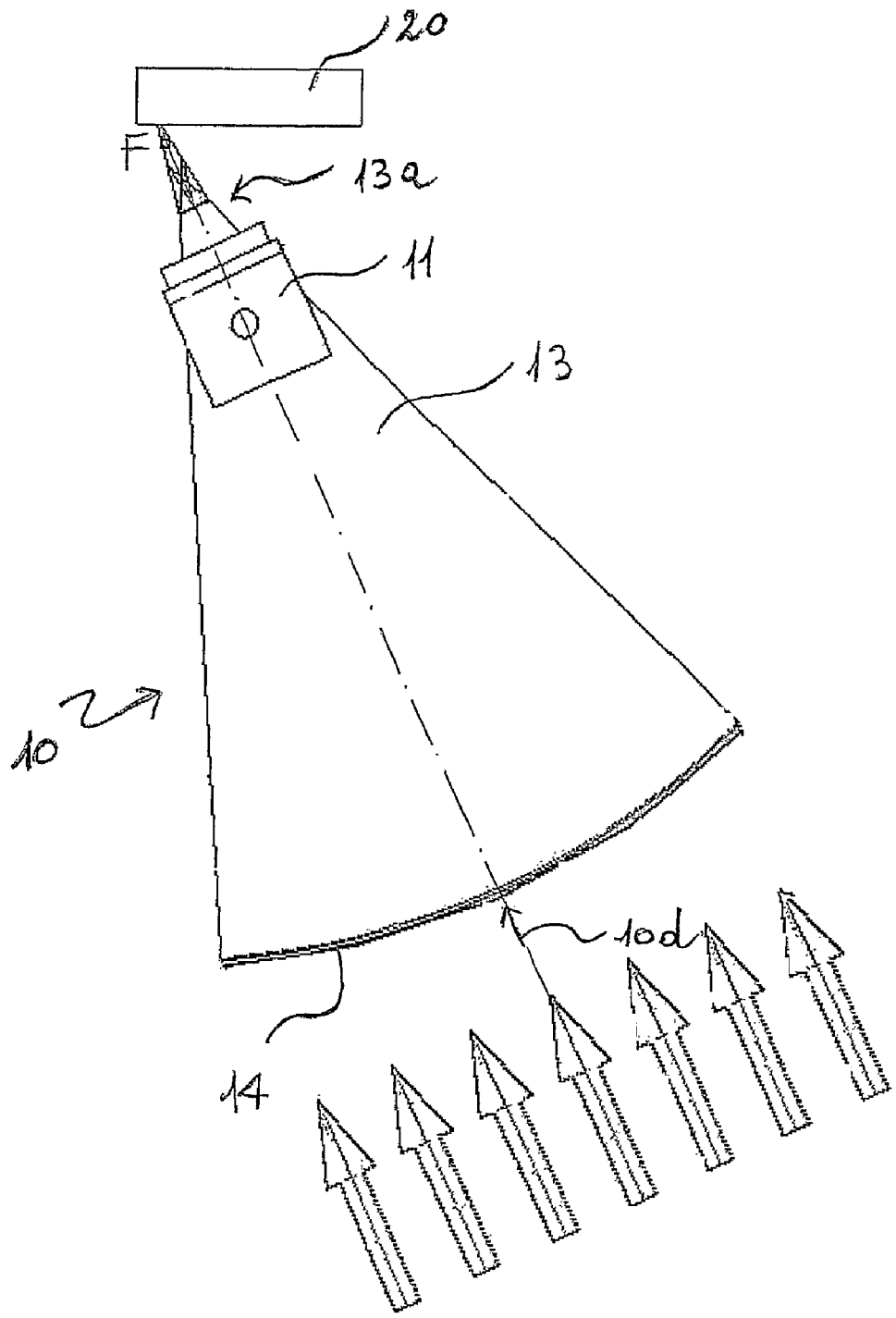
Figure 5C:
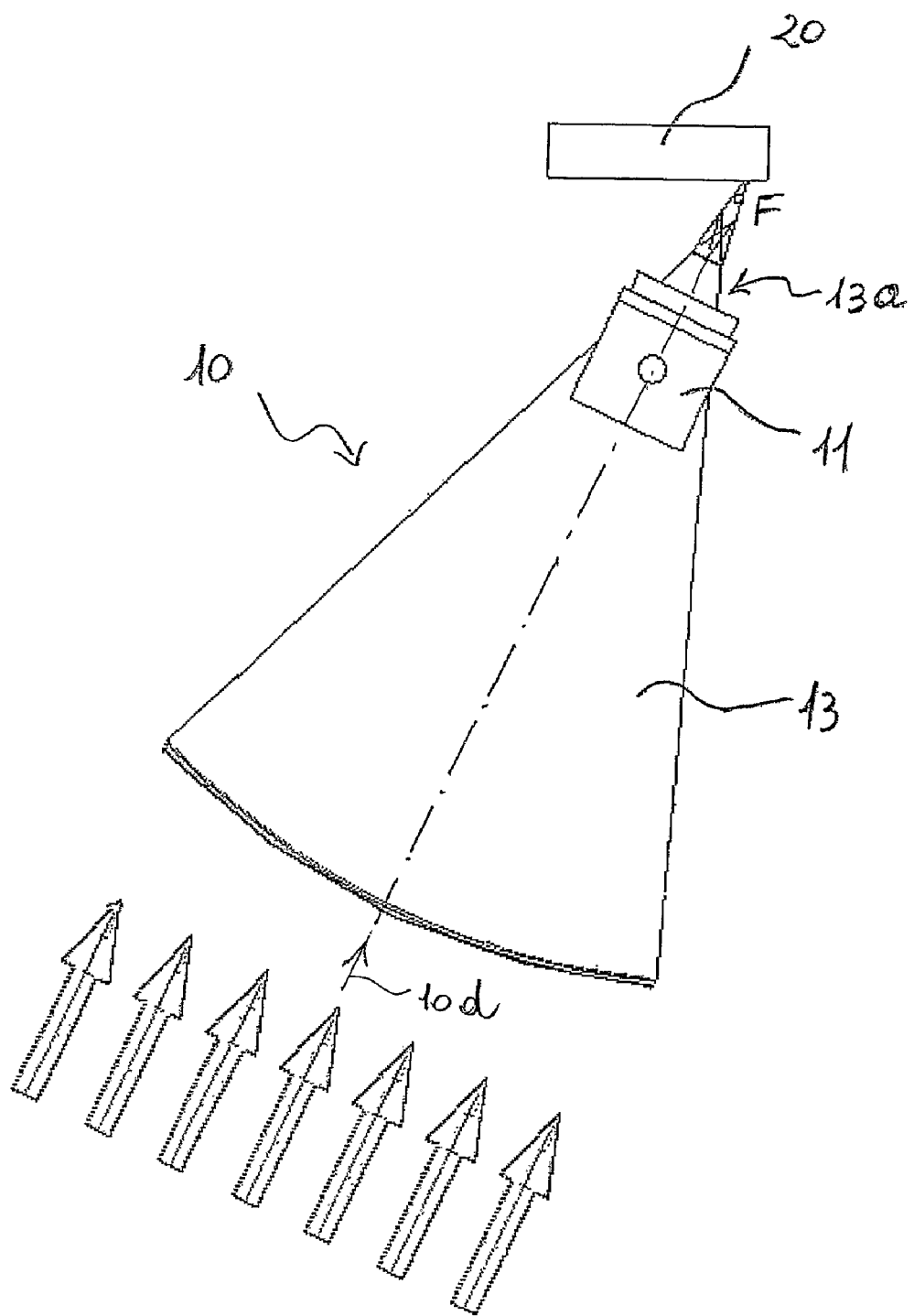

In particular, as is better illustrated in FIGS. 4, 5a-5c and 8, the second body portion 13 comprises an input face 14 for the light diffused by the illuminated optical code. Such face 14 defines a focusing lens for the light coming from the optical code. The focus F of such lens falls close to a zone 13a of the second body portion 13 opposite the face 14, and more in particular immediately downstream of such zone 13a in the optical collection path 10d. The longitudinal extension of the second body portion 13 in the aforementioned lying plane and its form are such that the axis X-X crosses such second body portion 13 close to the zone 13a and the centre of mass of the optical element 10 coincides with the axis X-X. In such a manner, the light spot formed on the photodiode 20 placed immediately downstream of the second body portion 13 along the optical collection path 10d is moved very little during the oscillation of the optical element 10, remaining in any case focused on the photodiode 20 during the rotation of the optical element, 10 around the axis X-X. FIGS. 5a-5c show, to such end, the movement of the focus F during the oscillation of the optical element 10.

Figure 6A:
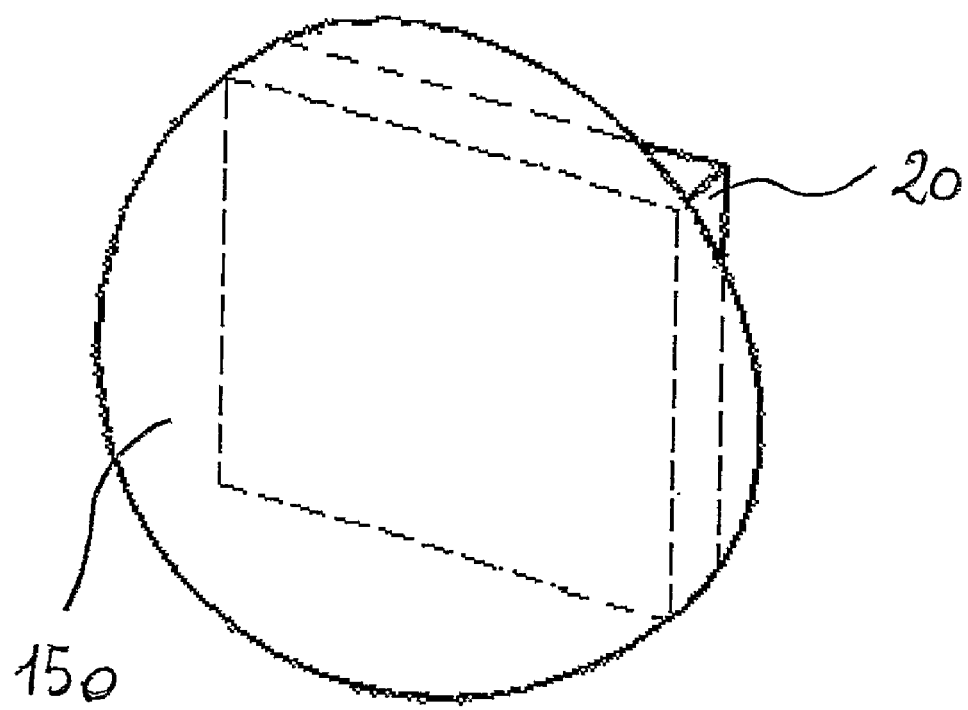
FIGS. 6a and 6b show two different embodiments of an accessory element of the device of FIG. 1.
Figure 6B:
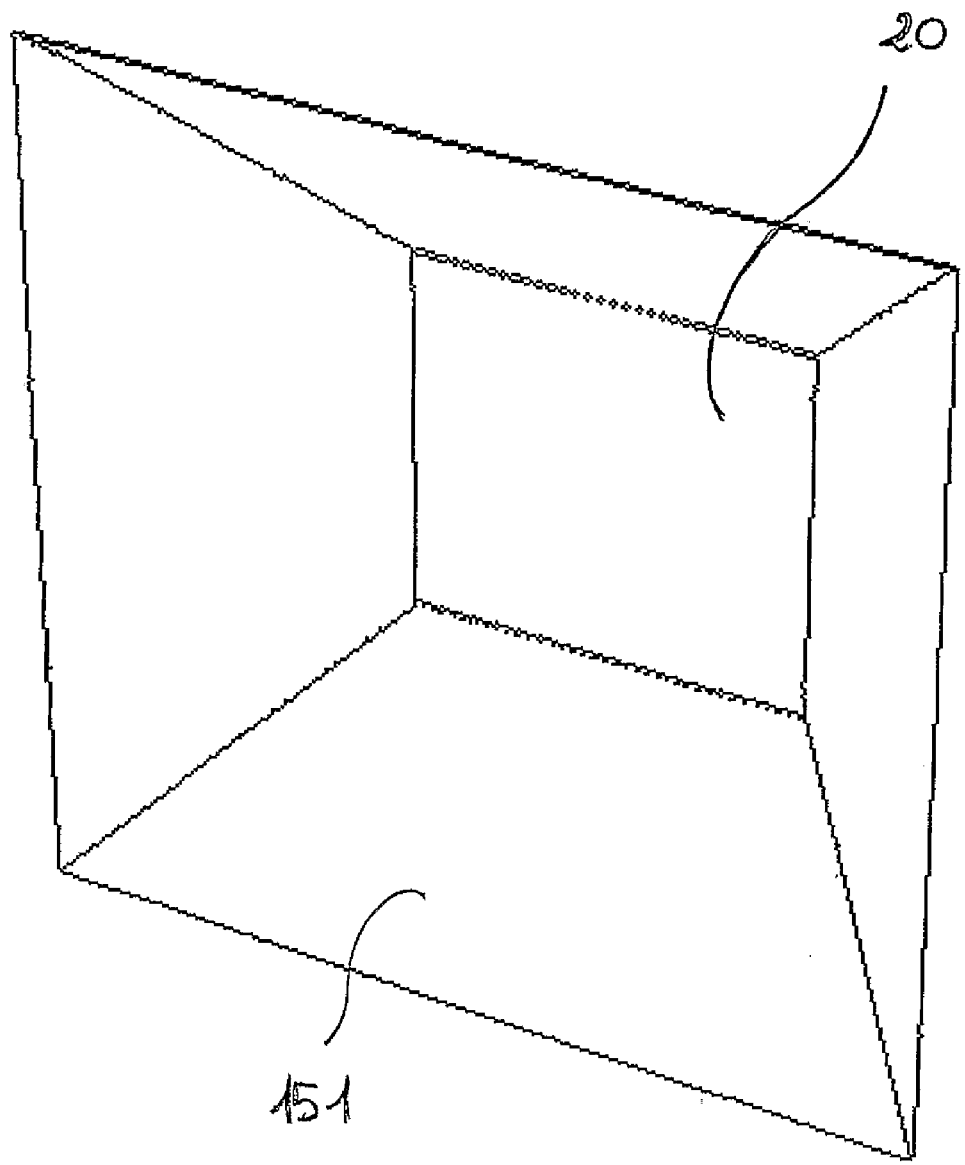

As an example, if the focal length of the face 14 of the second body portion 13 is 10 mm and the axis X-X is moved 1 mm with respect to the focus F, the light spot is moved, for a total oscillation of 50°, by a distance equal to 2*tan(25°) =0.93 mm, such a distance being amply covered by the sensitive area of commercially-available photodiodes. If the stroke of the focus F is excessive, it is possible to attach, on the surface of the photodiode 20, an optical accessory (for example a lens 150, illustrated in FIG. 6a, or a mirror-like concentrator 151, illustrated in FIG. 6b, or any other equivalent optical element) which reduces the effective displacement of the spot on the photodiode 20.

The body portion 13 of the collecting element is solid. An embodiment of the optical element 10 is however foreseen wherein the body portion 13 is hollow and the connection between the face 14 and the body portion 11 occurs by means of appropriate and conventional fixing devices.

As is visible in FIGS. 1, 4, 7 and 8, the optical element 10 comprises a third body portion 15 substantially coaxial with the axis X-X (and thus with the first body portion 11). The third body portion 15 is spatially arranged on the side opposite the first body portion 11 with respect to the second body portion 13 along the axis X-X. It is therefore arranged above the second body portion 13 in the operating configuration of the device 1. As is visible in FIGS. 1, 4, 7 and 8, the body portions 11 and 15 have substantially circular section and have a smaller diameter than that of the central portion from which the body portion 13 protrudes.

The body portion 15 defines a coupling portion of the optical element 10 to a support plate 30. The plate 30 is adapted to be coupled with a support element 31, in turn adapted to be fixed to the PCB 200, as will be better explained below. The support plate 30 and the support element 31 therefore constitute an anchoring structure of the optical element 10 to the PCB 200.

Figure 8:
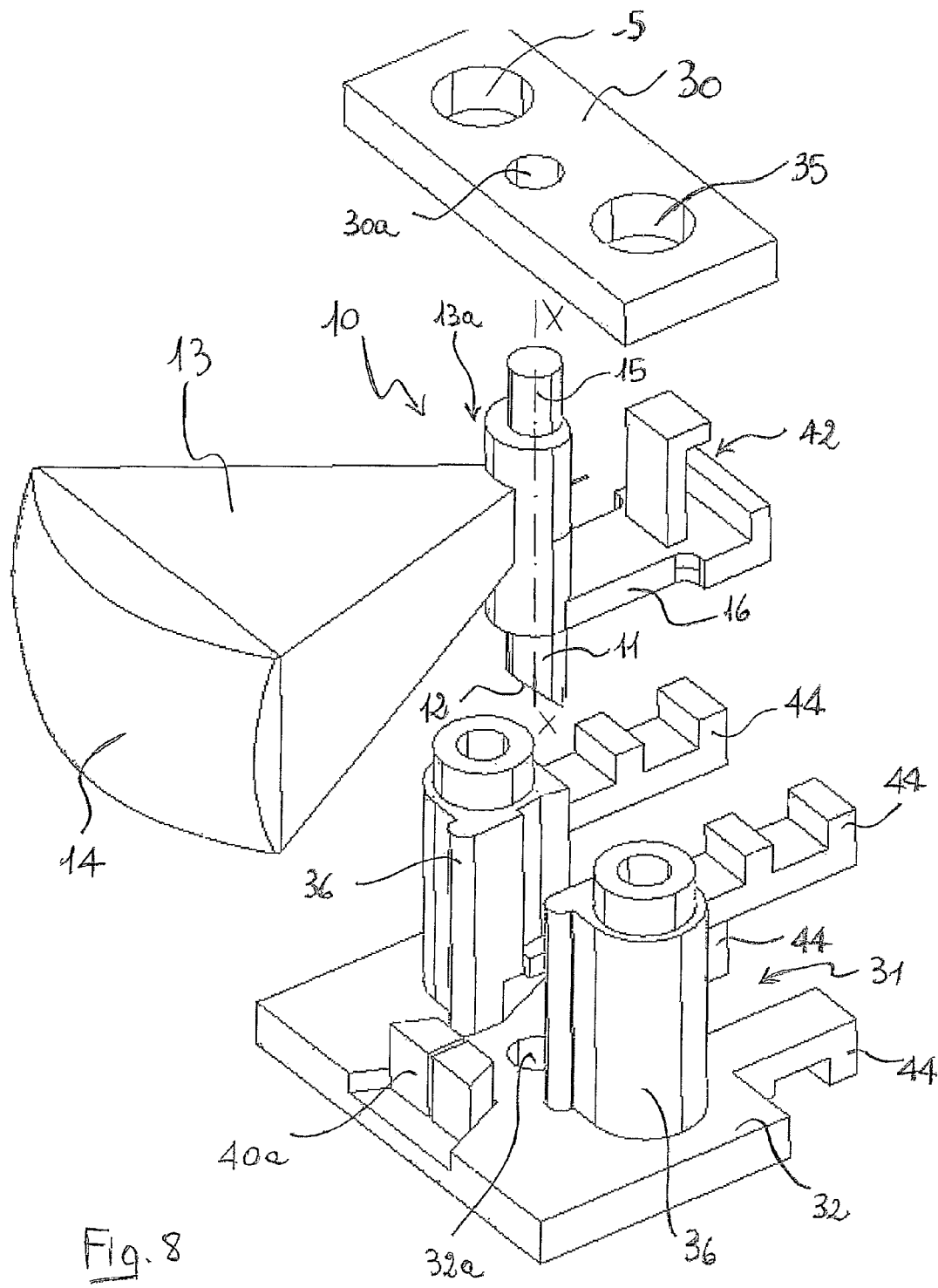
FIG. 8 is an exploded perspective view of the optical element of FIG. 7 and of an anchoring structure of the same.

As is better seen in FIGS. 1, 4 and 8, the body portion 15 of the optical element 10 is inserted into a suitable hole 30a formed in the centre of the support plate 30, while the first body portion 11 of the element 10 is inserted into a suitable hole 32a formed on a base plate 32 of the support element 31. Between the body portion 15 and the corresponding coupling hole 30a and between the body portion 11 and the corresponding coupling hole 32a, respective rolling or friction bearings are provided, not shown in the enclosed figures. The surface 12 of the body portion 11 projects below the base plate 32 of the support element 31.

The support plate 30 is made integral with the support element 31 by means of two holes 35 formed on the support plate 30 on opposite sides of the central hole 30a and coupled to corresponding connection arms 36 which extend upward from the base plate 32 of the support element 31. Each connection arm 36 has a threaded blind hole which extends longitudinally. In such holes, respective screws 37 are inserted (FIGS. 1-3) which pass in corresponding holes formed on the PCB 200, permitting in this manner the fixing of the optical element 10 to the PCB 200. The support element 31 can be made in a single piece by means of a moulding process.

In practice, the optical element 10 is rotatably associated with the anchoring structure defined by the support plate 30 and by the support element 31, and by means of such anchoring structure, it, is supported by the PCB 200.

Figure 26:
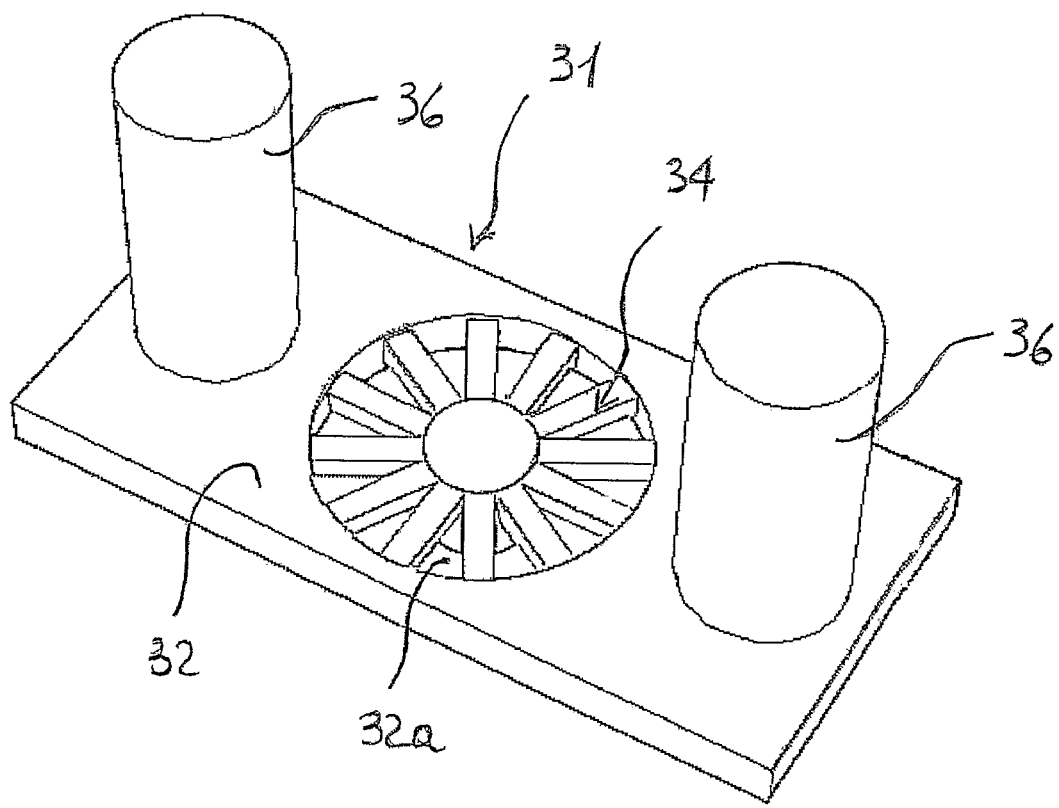
FIG. 26 is a perspective view of a specific embodiment of a detail of the device of FIG. 1.
Figure 24:
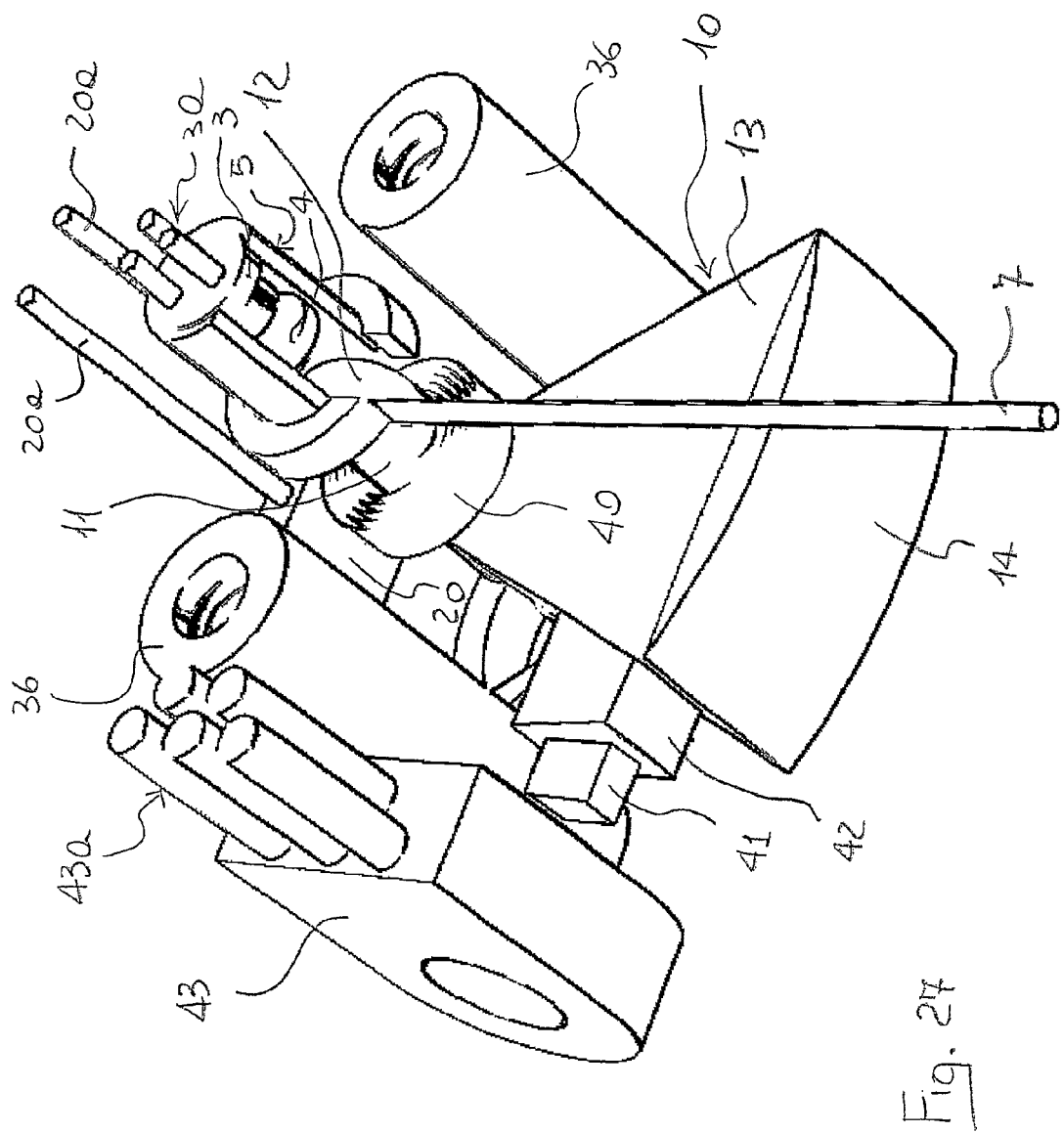

In the embodiment illustrated in FIG. 26, the support element 31 comprises a plurality of damper elements 34, housed in a radial arrangement in the hole 32a of the base plate 32 of the support element 31, so as to be operatively interposed between bearings (not illustrated) associated with the body portion 11 of the element 10 and the support element 31. Such damper elements 34 act as protection for the entire device in the case of strong vertical stresses. Alternatively or additionally, the damper elements 34 can be housed in the hole 30a of the support plate 30, so as to be operatively interposed between bearings associated with the body portion 15 of the element 10 and the support plate 30.

In the device 1 of the present invention, the oscillating motion of the optical element 10 around the axis X-X is obtained by providing a resonant element associated with the optical element 10 and excitation means of said resonant element.

In particular, in the embodiment illustrated in FIGS. 1-4 and 7-10, the resonant element is composed of a plate 40 in elastic material which has one end fixed in a housing seat 40a provided in the base plate 32 of the support element 31 and the other end fixed in a housing seat 40b provided on the lower face of the body portion 13 of the optical element 10 (FIGS. 4, 7 and 8).

The oscillating motion is imparted by a permanent magnet 41 housed in a suitable seat 42 formed on a body portion 16 of the element 10 extended on the side opposite the body portion 13 with respect to the axis X-X. The magnetization axis M1 of the magnet 41 is perpendicular to the axis M2 of an electric winding 43 (or coil) wound on suitable support arms 44 which extend cantilevered from the connection arms 36 and from the base plate 32 of the support element 31 (FIGS. 4 and 8).

The plate 40 maintains the optical element 10 in its central rest position when the coil 43 is not energized (FIG. 5a). By supplying a periodic electric current to the coil 43, a force is induced which puts the optical element 10 in rotation around the axis X-X with respect to the rest position. The coil 43 repels or attracts the magnet 41, bending the plate 40. As soon as the power supply to the coil 43 is interrupted, the plate 40 acts as a spring, making the optical element 10 oscillate (FIGS. 5b and 5c). After a certain period, the coil 43 is once again supplied with power and provides a new impulse to the plate 40. Tuning the frequency of the impulses with the resonance frequency of the assembly composed of the optical element 10 and the magnet 41, a periodic scanning motion is obtained.

The structure described above permits, in design step, adjusting the length of the portion 16 of the optical element 10 so as to provide an adequate torque on the optical element 10 around the axis X-X, and at the same time counterbalancing the weight of the optical element 10 in order to make its centre of mass fall on the axis X-X.

In order to have good operation of the device 1, it is necessary to prevent that the coil 43 excites different vibration modes from that described above, which consists in a pure rotation around the axis X-X. This can be done by either physically preventing the insertion of such spurious modes, setting mechanical constraints to the motion of the scanning and light collecting element 10, as exemplified in the first embodiment, by means of seats 30a and 32a, or by appropriately balancing the element 10 and appropriately designing the device so that the structure's resonance modes are all at significantly higher frequencies and with substantially lower Q-factors. Designing the device in this manner, the use of the seats 30a and 32a is no longer absolutely necessary for rigidly constraining the motion. In this manner, the further embodiments which are described below can be achieved, which are adapted both for a "constrained" embodiment and for a "balanced" embodiment. An embodiment of "balanced" type, however, does not ensure that, in the case of collisions, i.e. random impulsive excitation, other modes with significant amplitude are not triggered. The presence of the damper elements 34 ensures that the pulses deriving from such possible collisions do not overlap those triggered by the coil 43.

Figure 11A:
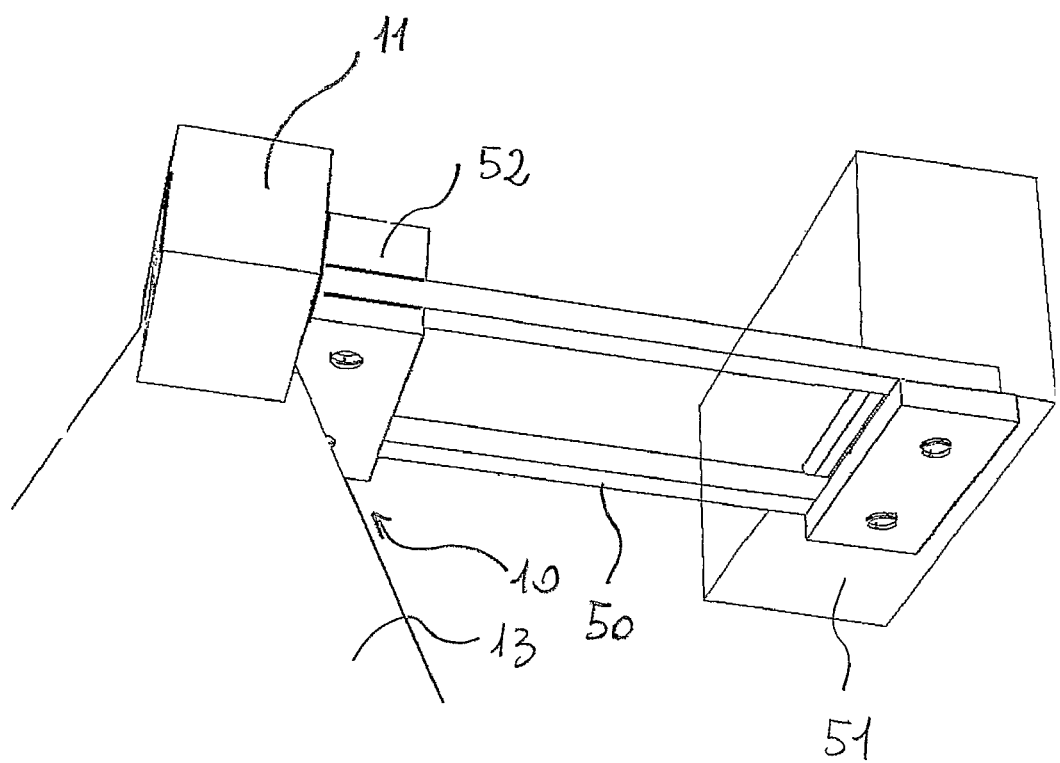
FIGS. 11a, 11b and 11c show a part of an alternative embodiment of the device of the present invention in three different operating configurations during the operation of such device.
Figure 11B:
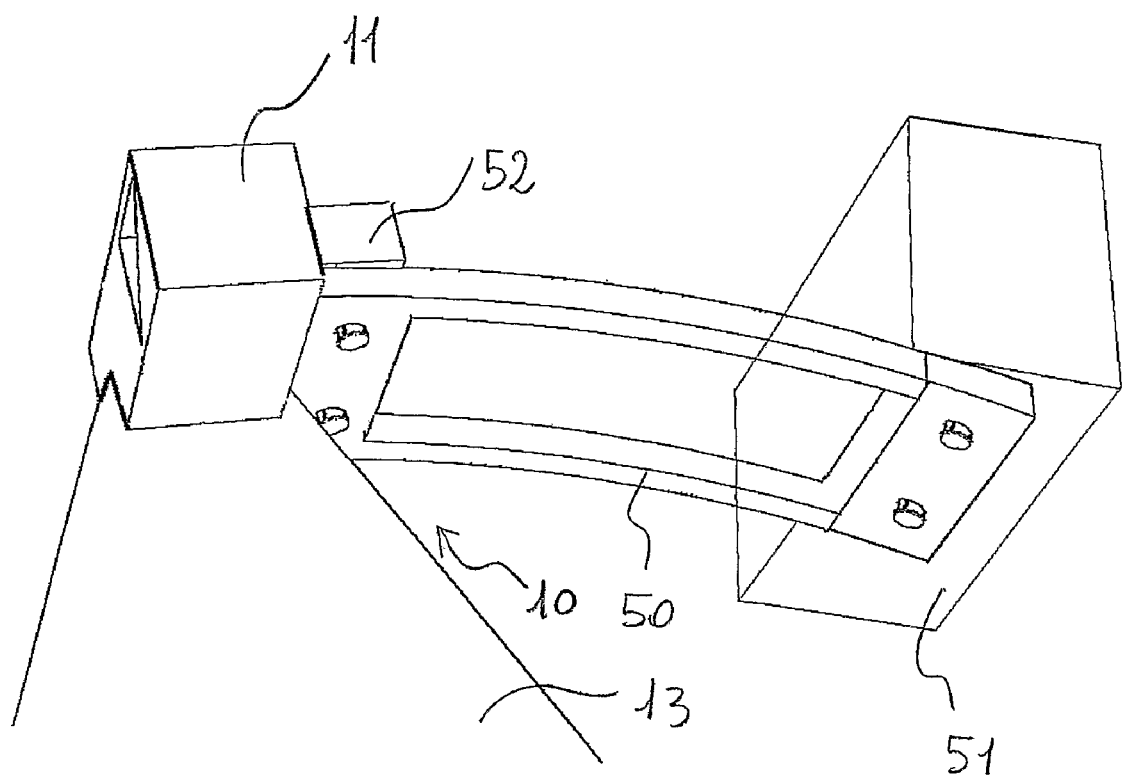
Figure 11C:
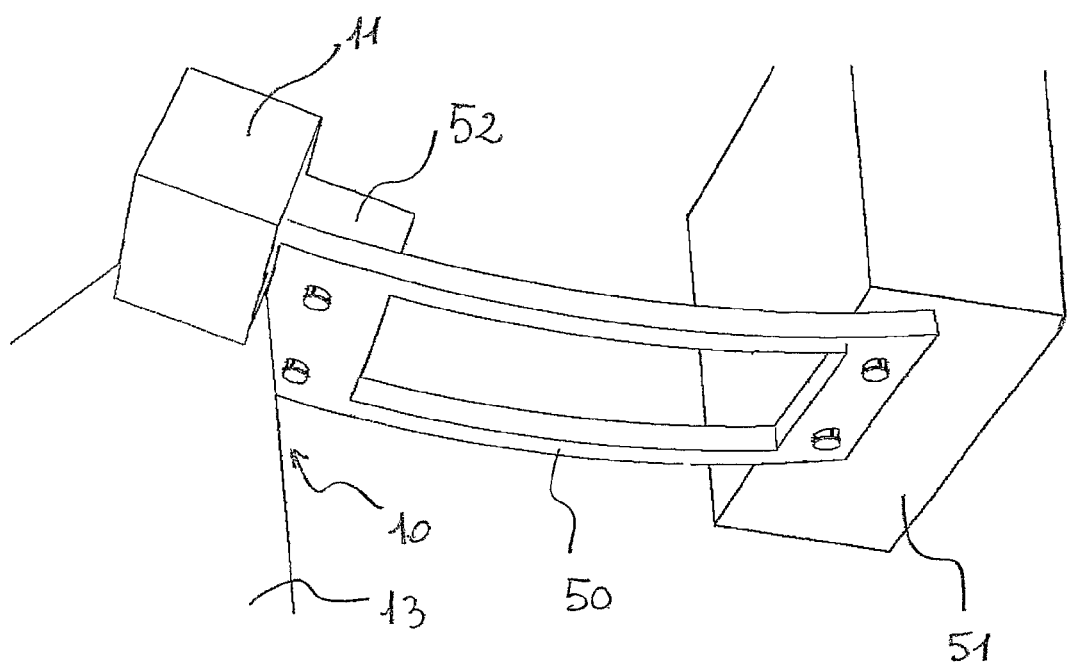

FIGS. 11a-11c and 14 show an alternative embodiment of the device of the present invention. With respect to the embodiment of FIG. 1, in this embodiment the first body portion 11 is so shaped to define a total internal reflection prism, as shown in FIGS. 12 and 13. Nothing forbids, however, making in such body portion the mirror-like surface discussed with reference to FIGS. 1-4 and 7-10. The embodiment of the FIGS. 11a-11c and 14 moreover differs for the fact that the coil 43, the magnet 41 and the housing seat 42 of the magnet 41 are all arranged laterally with respect to the optical element 10. The coil 43 is fixed to the PCB 200 by means of a support element, not shown. Moreover, such embodiment differs from the one described above for the fact that the resonant element consists of a planar spring 50. The spring 50 is fixed on one side to a fixed support 51, suitably provided in the device 1 and the support 51 in turn is fixed to the PCB 200, and on the other side, to a suitable support 52 formed laterally on the optical element 10 near the axis X-X. The fixing of the ends of the spring 50 to the aforementioned supports 51 and 52 occurs in an entirely conventional manner, for example by means of screws or clips. The traction exerted by the magnet 41 which is subjected to impulsive excitation by the coil 43 causes the deformation of the spring 50. Such deformation causes the generation of a restoring force. Also in this case, if the excitation is periodic, impulsive and set on the oscillation frequency of the optical element 10, the latter is moved with a harmonic motion at the desired frequency. FIGS. 11b and 11c show two maximum deformation configurations of the spring 50.

A further alternative embodiment of the device of the present invention is illustrated in FIG. 15. This embodiment differs from that of FIG. 1 for the fact that the axis M2 of the coil 43 is parallel to the axis X-X. In this case, there are two functionally equivalent configurations for the orientation of the axis of the magnet 41: a first configuration consists in arranging the magnet 41 at rest such that its magnetization axis M1 is parallel to the axis M2 of the coil 43, but translated with respect to this. The other configuration consists of arranging the magnet 41 such that its magnetization axis M1' is perpendicular to the axis X-X and therefore also to the axis M2 of the coil 43. In both cases, an impulsive excitation of the coil 43 will cause a movement of the optical element 10 from its rest position which will be recovered by the restoring force of the resonant element and thus will trigger the oscillation.

Figure 16:
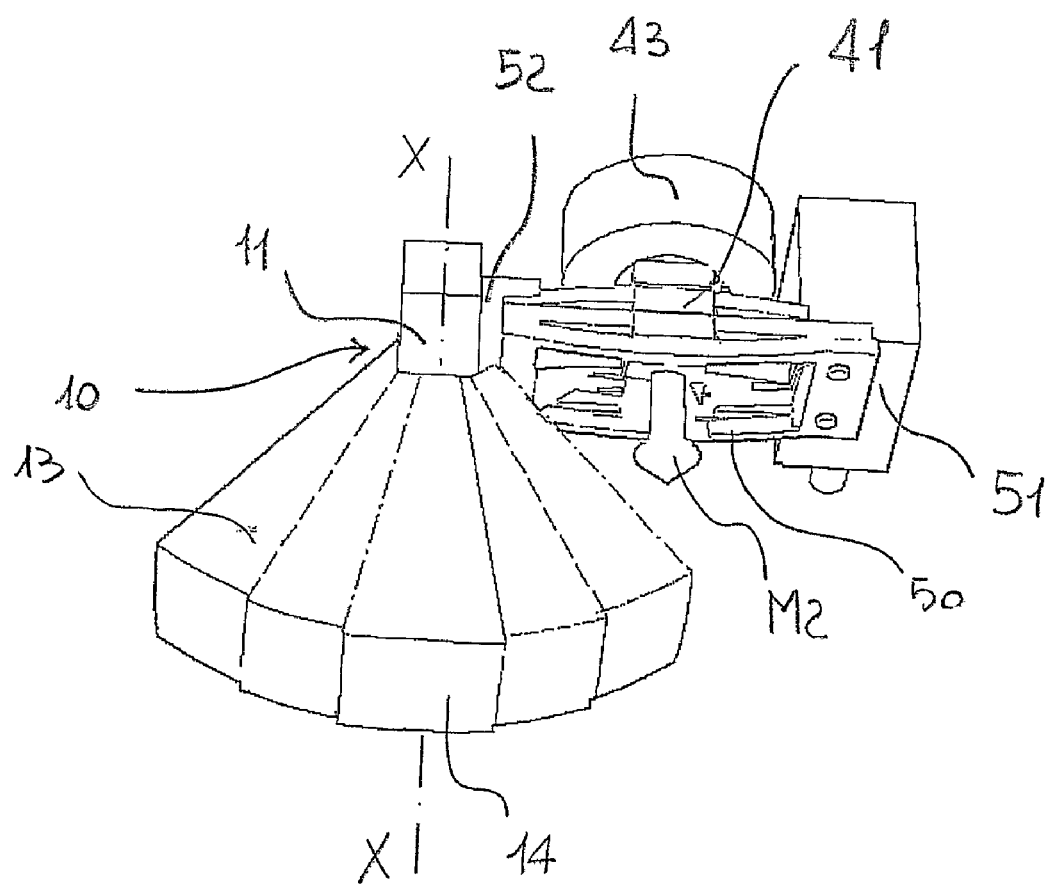
FIG. 16 is a perspective view of a significant portion of a further alternative embodiment of the device of the present invention.

FIG. 16 shows a further alternative embodiment of the present invention. Such embodiment differs from that of FIG. 14 for the fact that the magnet 41 is arranged directly on the planar spring 50 and the coil 43 is arranged just behind the magnet 41. In this manner, a current impulse in the coil 43 attracts the section of the spring on which the magnet is attached, causing the oscillation of the optical element 10. The figure shows the planar spring 50 in three bending positions and the optical element 10 in three corresponding positions.

Figure 17:
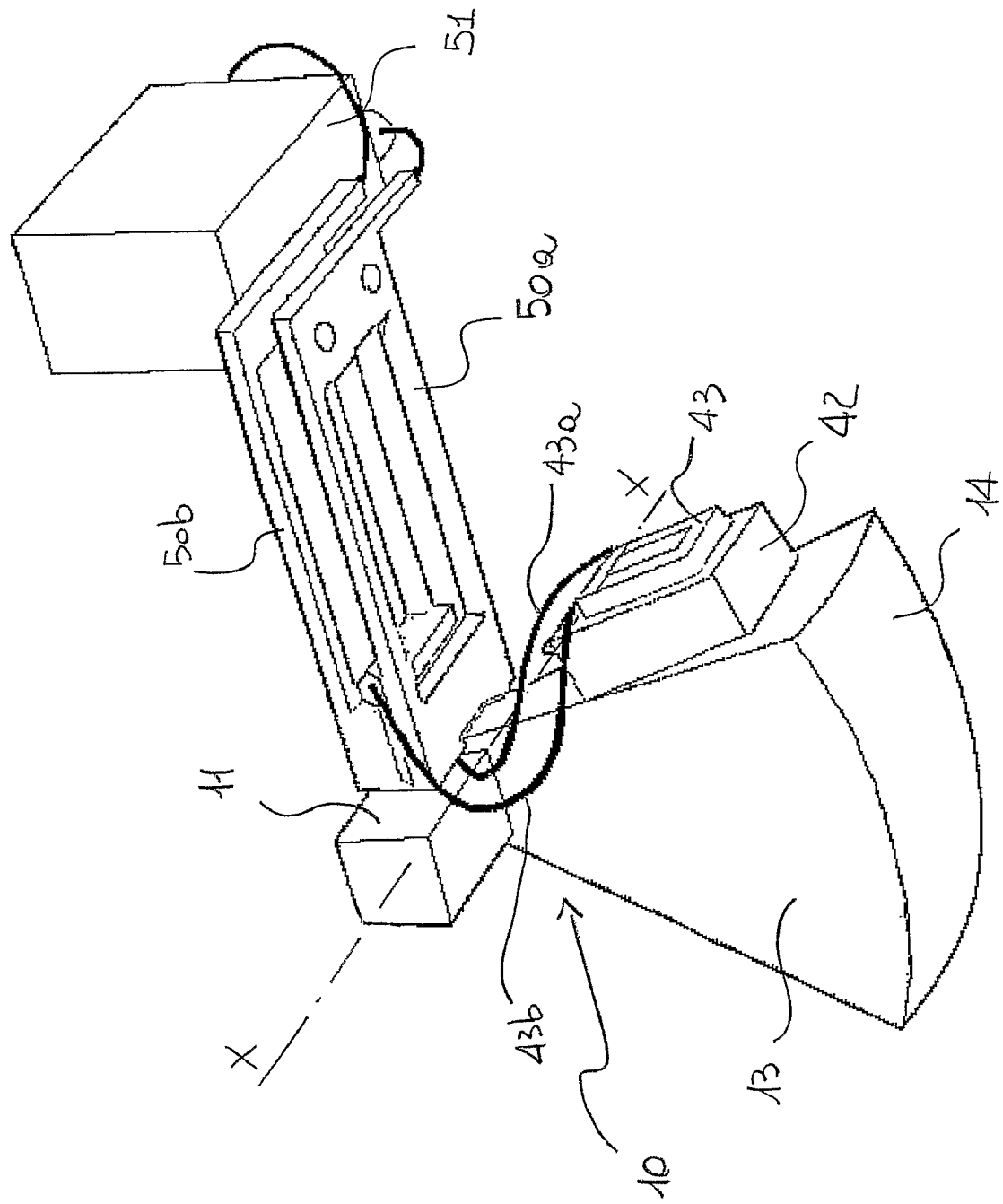
FIG. 17 is a perspective view of a significant portion of still another further alternative embodiment of the device of the present invention.

In a further embodiment, illustrated in FIG. 17, the position of the coil 43 and magnet 41 are reversed. In practice, the wire of the coil 43 is wound directly on the optical element 10 and the magnet (not shown in the figure) is fixed and facing in front of this. The ends 43*a*, 43*b* of the coil 43 are connected to the ends of the planar spring 50, which in this case is substantially split, or rather comprises two superimposing layers 50*a*, 50*b* arranged very close to and electrically isolated from each other, which oscillate synchronously.

Figure 18:
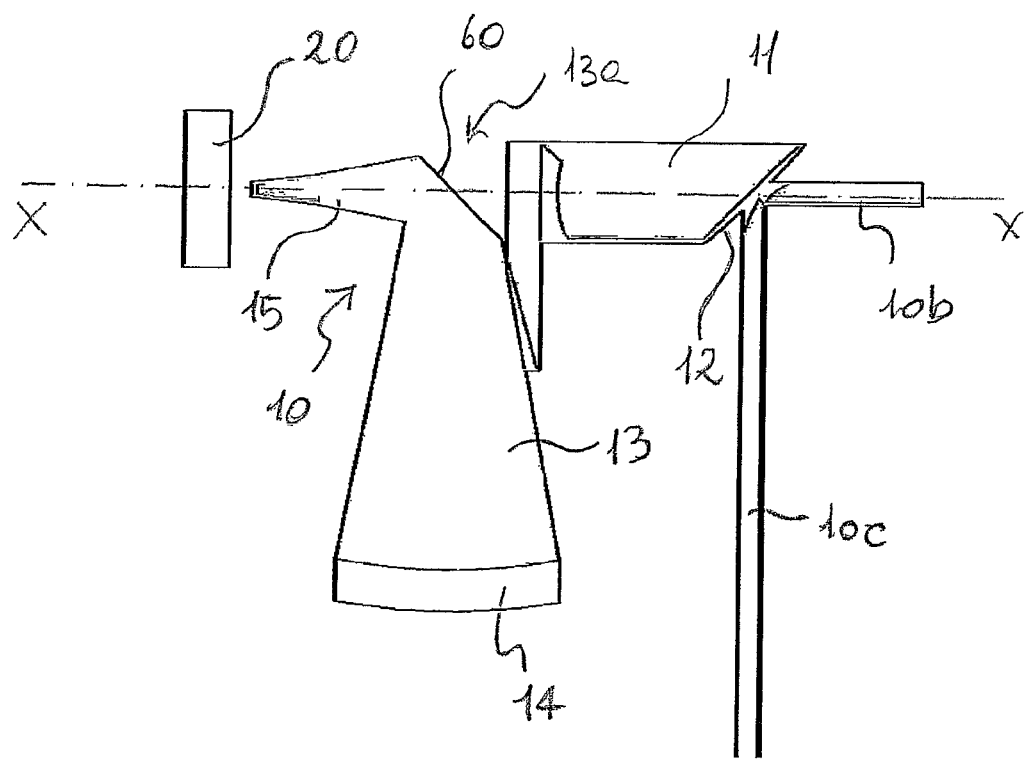
FIG. 18 is a side view of a significant portion of a further alternative embodiment of the device of the present invention, with a trace of the optical emission path.

FIG. 18 shows a further embodiment of the present invention. In this embodiment, the optical element 10 comprises, at its zone 13*a* opposite the collecting face 14 of the light diffused by the illuminated optical code, a tilted surface 60, preferably tilted at 45° with respect to the axis X-X in order to deflect the light beam diffused by the illuminated optical code, and collected by the optical element 10, preferably tilted at 90°. Preferably, the surface 60 is of a plastic material and exploits total internal reflection, but an embodiment is also foreseen in which the surface 60 is a reflecting mirror-like surface.

Once deflected from the surface 60, the light beam is sent to the photodiode 20 along a direction coaxial with the axis X-X. The photodiode 20 is therefore in this case arranged downstream from the third body position 15 of the optical element 10, in a position coaxial with the axis X-X. Advantageously, the light beam focused on the photodiode 20 does not move during the oscillation of the optical element 10, but only undergoes a rotation.

The device can have an anchoring structure to the PCB 200, a resonant element and excitation means which are substantially identical to those of the embodiment of FIG. 1. The photodiode 20 can either be mounted directly on the PCB 200 or fixed in a seat appropriately made in the support plate 30, between the holes 35.

Figure 19:
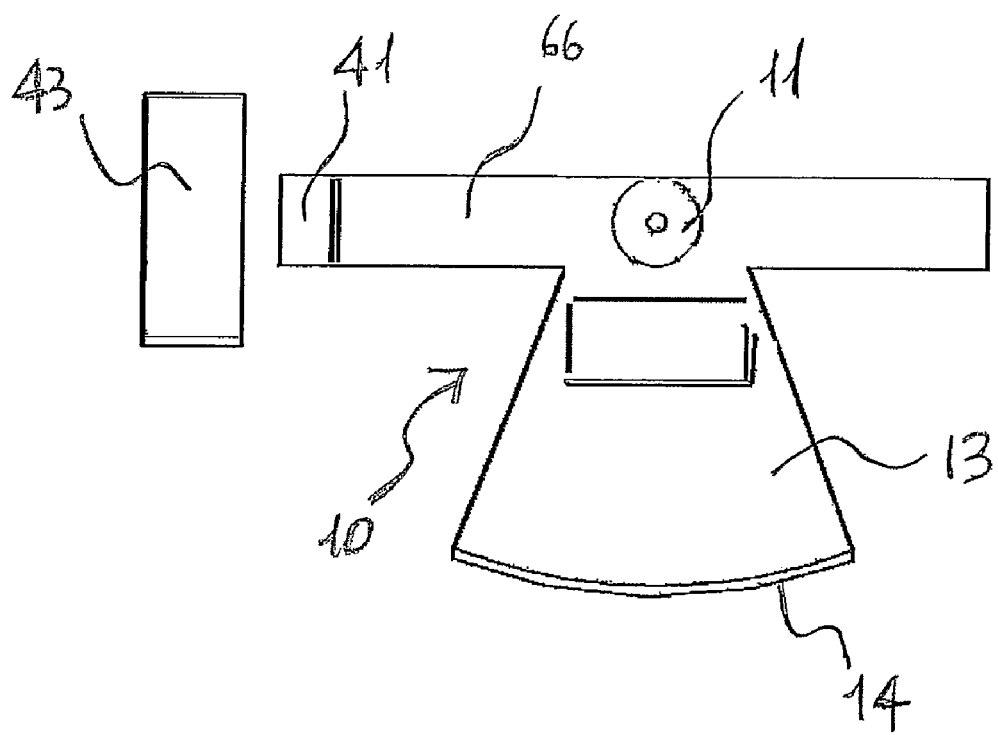
FIG. 19 is a bottom view of a further alternative embodiment of the device of the present invention.

FIG. 19 shows a further device of the present invention. In this embodiment, the magnet 41 is sustained by an arm 66 oriented at 90° with respect to the optical collection path 10*d*. The displacement of the optical element 10 from its rest position occurs by means of the coil 43, appropriately positioned with respect to the magnet 41.

In the device of the present invention, in all the embodiments described, the resonant element is so shaped to provide an adequate restoring torque when the optical element 10 is moved from the equilibrium position. The natural oscillation frequency of the optical element is determined by the moment of inertia of the optical element 10 around the axis X-X and by the elastic constant of the resonant element. Both the equilibrium position and the elastic constant of the resonant element must therefore be substantially independent of the environmental conditions (temperature, humidity, etc.). To ensure that the equilibrium position of the system does not vary with the changes of the environmental conditions, a system of springs can be used which provides a pair of opposed moments, so as to compensate possible variations of the environmental conditions. For example, the resonant element can be constituted by a pair of springs with counter spiral springs 400*a*, 400*b*, as illustrated schematically in FIG. 20.

Figure 20:
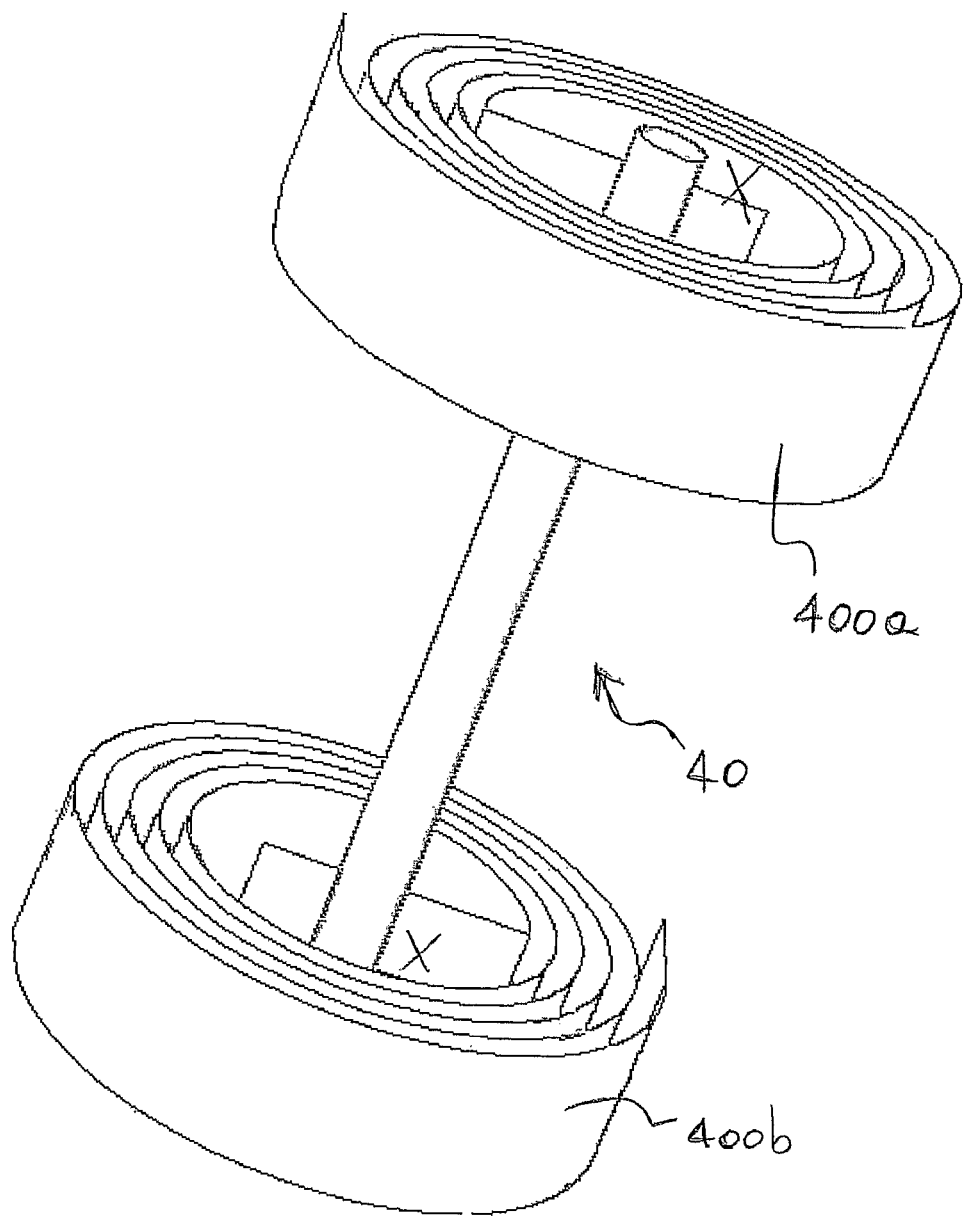
FIG. 20 is a perspective view of an alternative embodiment of a resonant element which can be used in the device of FIG. 1.
Figure 21:
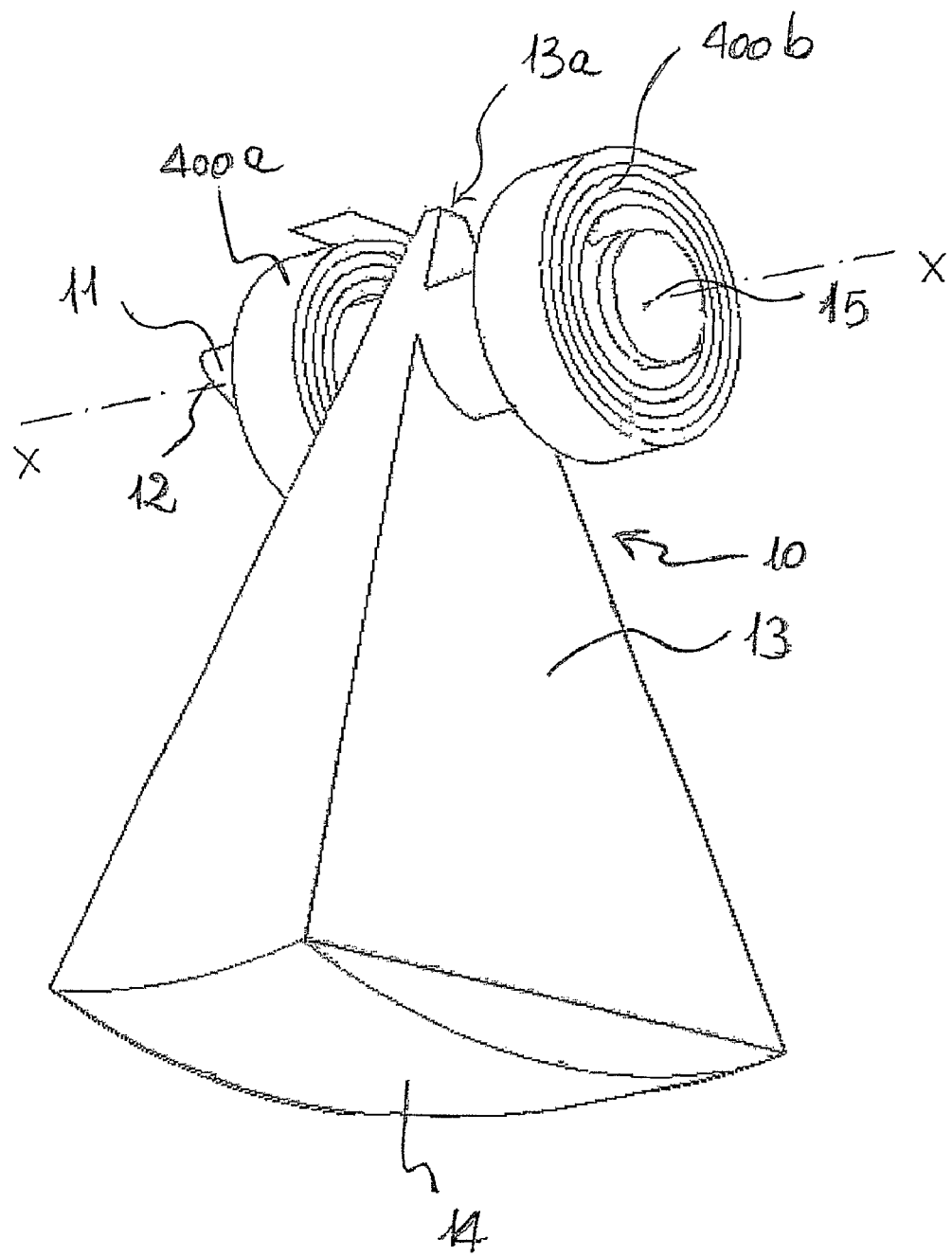
FIG. 21 is a perspective view of the optical element of FIG. 5 with the resonant element of FIG. 20 associated therewith.

FIG. 21 shows an embodiment of the present invention in which use is made of the spring system illustrated in FIG. 20. In this case, both the springs 400*a*, 400*b* have a first end fixed to the optical element 10 and a second end fixed to a static component of the device, for example the anchoring structure described and illustrated above. In particular, a first spring 400*a* is associated with the body portion 11 and a second spring 400*b* is associated with the body portion 15 of the optical element 10. Possible variations of the environmental conditions lead to symmetric variations of the moment of the springs 400*a*, 400*b* with respect to the axis X-X and consequently the rest position of the optical element 10 does not vary. According to one variant, in place of the pair of spiral springs 400*a* and 400*b*, a single spiral spring of analogous type may be provided in the device 1, with one end fixed for example to the housing seat 40*a* and the other end fixed to the first body portion 11, or with a first end fixed to the support plate 30 and the other end fixed to the third body portion 15 (FIG. 4).

Figure 22:
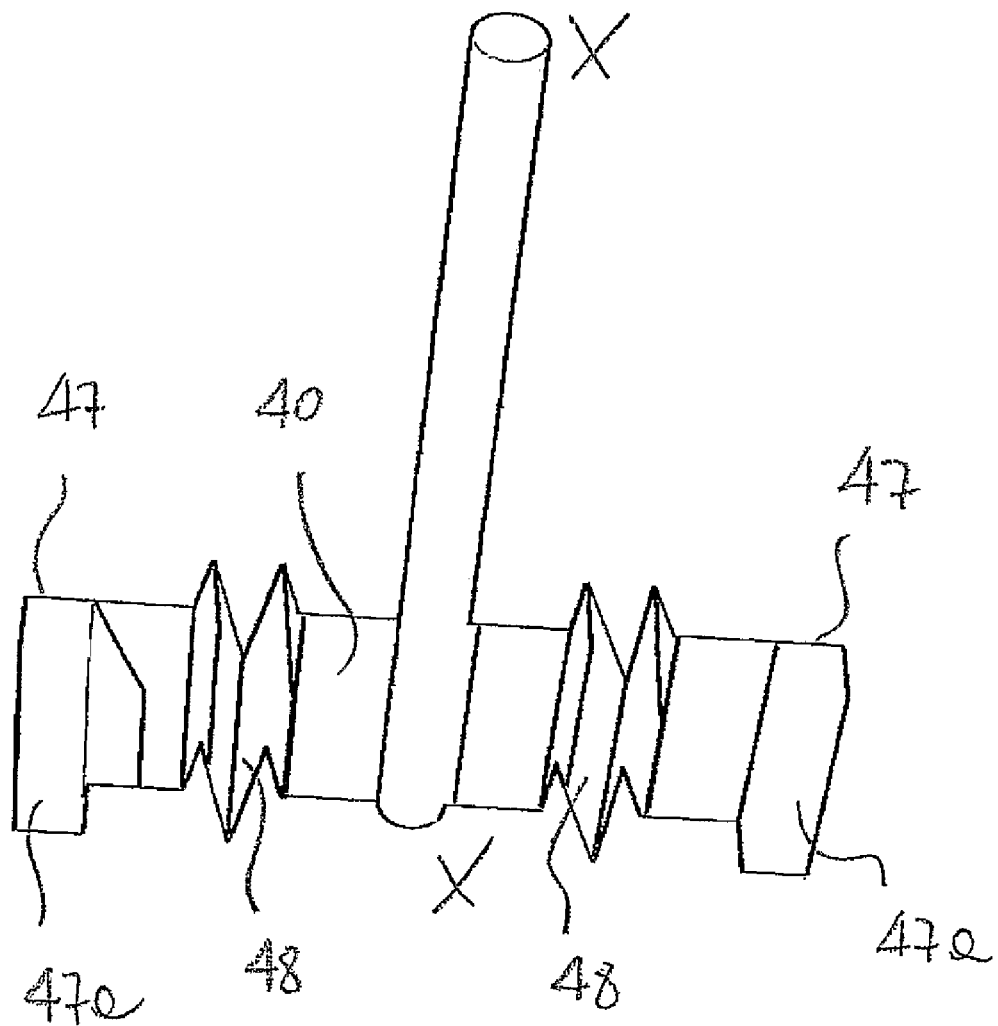
FIGS. 22 and 23 are perspective views of further alternative embodiments of a resonant element which can be used in the device of FIG. 1.
Figure 23:
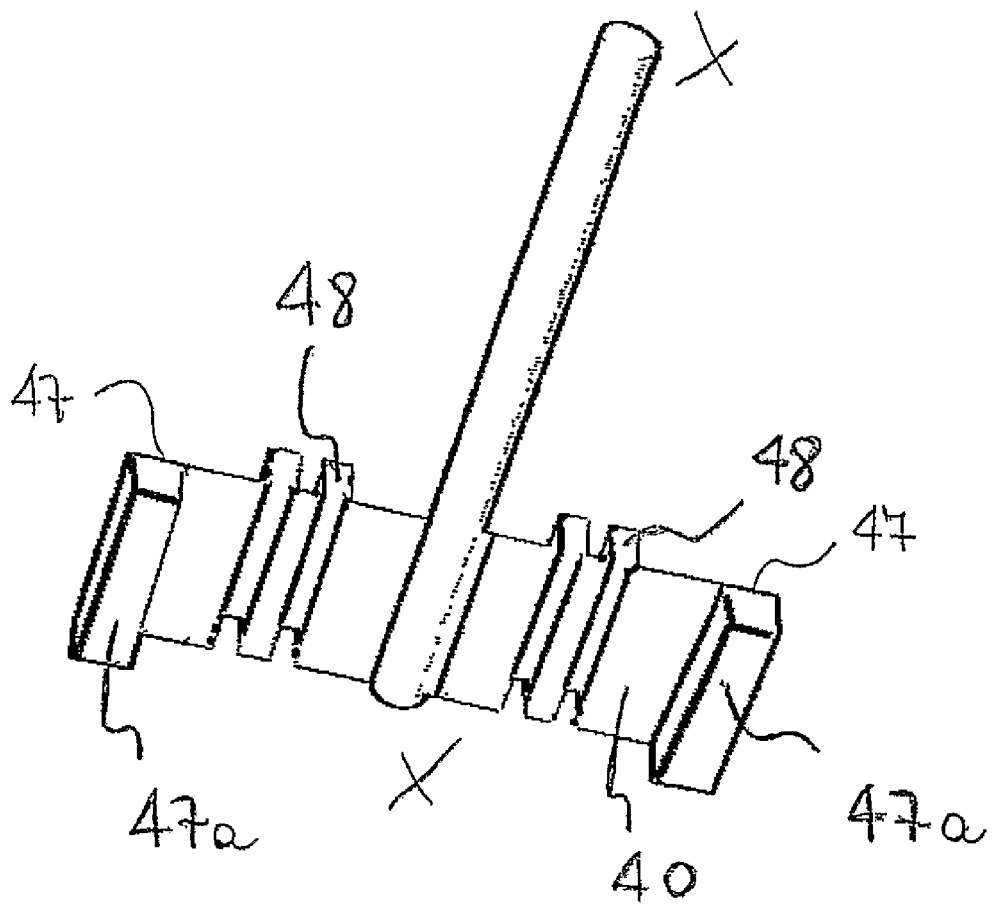
Figure 24A:
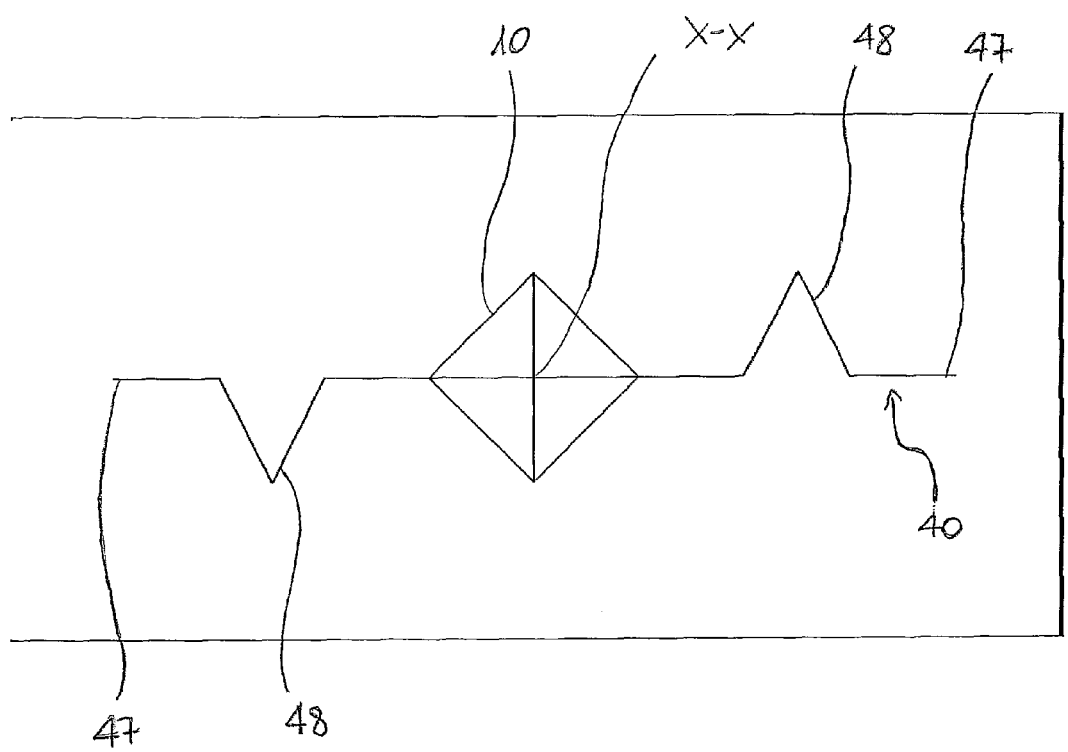
FIGS. 24a and 24b schematically represent two work positions of the resonant element of FIG. 22 or 23.
Figure 24B:
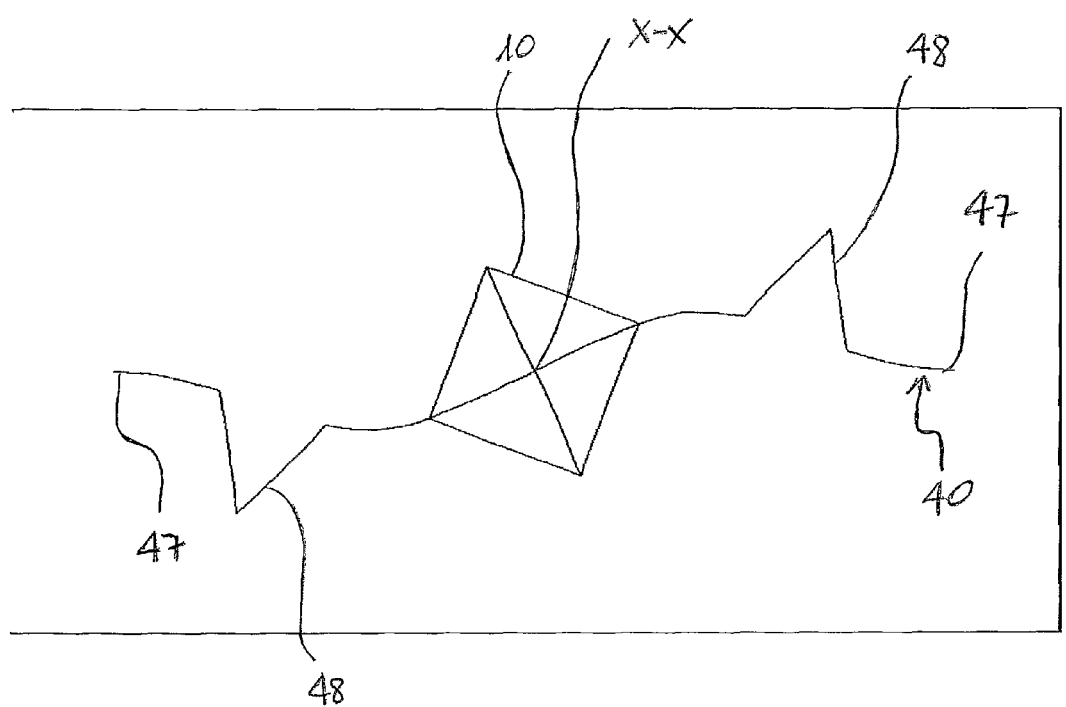

The same functionality of the pair of counter spiral springs can be obtained by using, in place of the pair of springs 400*a*, 400*b*, an appropriately shaped spring, as for example illustrated in FIGS. 22 and 23. Such spring is composed of a plate 40 provided with two ends 47 and with two folded or bent portions 48. The two ends are integral with two respective static components 47*a* of the device (which can consist of the connection arms 36 which extend upward from the base plate 32 of the support element 31 of FIG. 1) and the rotation axis X-X is arranged at the centre of the plate 40. The two folded portions 48 permit to finely adjust the elastic constant of the plate 40. The FIG. 24*a* represents the plate 40 in rest condition. FIG. 24*b* represents, on a very exaggerated scale, in order to clarify the functioning principle, the plate 40 in torsional configuration around the axis X-X. The two folded portions 48 are open and provide a restoring force towards the equilibrium condition. An appropriate choice of the dimensions of the plate 40 in the direction of the X-X rotation axis permits minimising the movement of the optical element 10, (schematically shown in the figure in the form of a square) in the direction identified by such axis.

Figure 25:
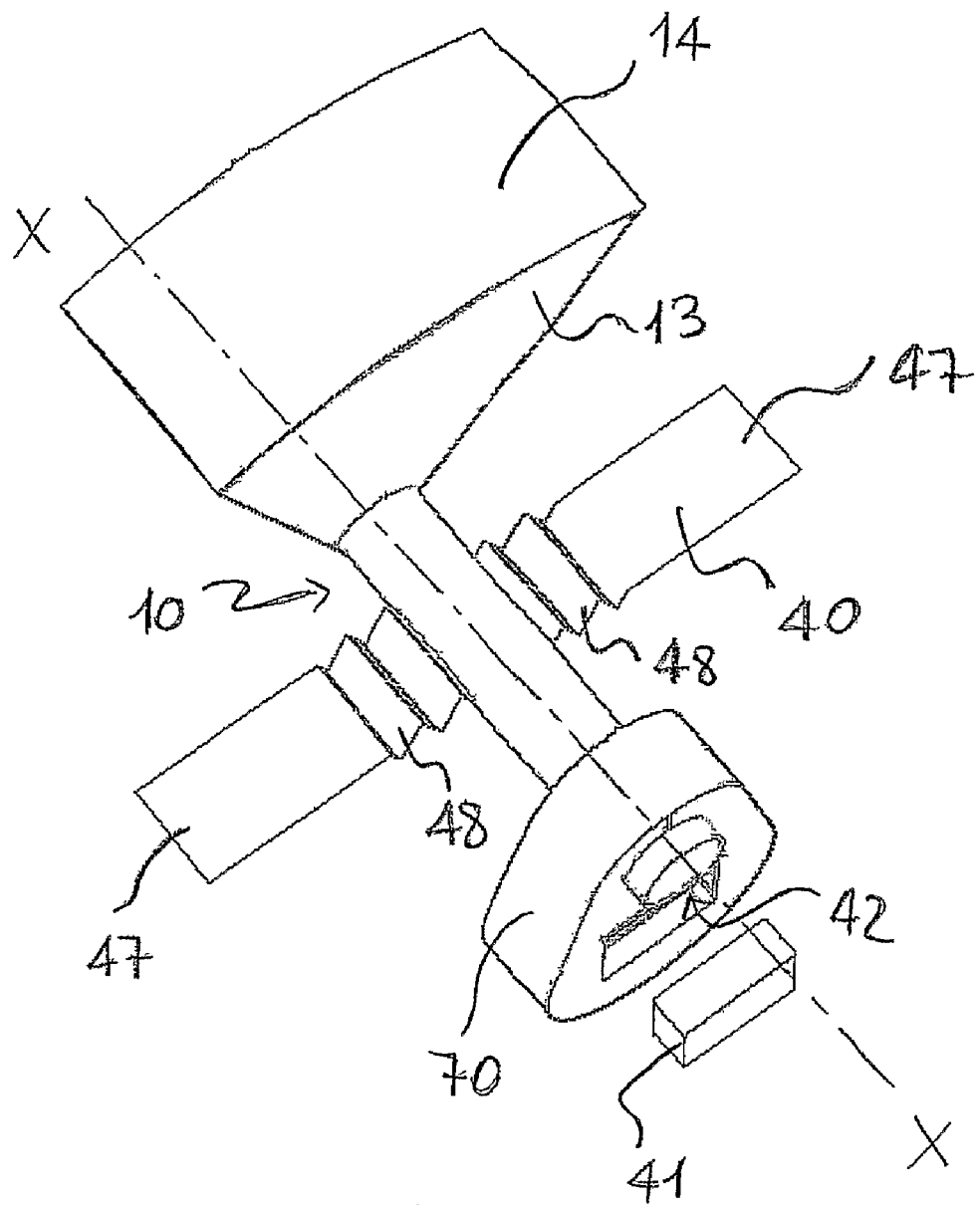
FIG. 25 is a perspective view of an alternative embodiment of the optical element of FIG. 5 with the resonant element of FIG. 22 associated therewith.

FIG. 25 shows an additional embodiment of the device of the present invention. This embodiment differs from that of FIG. 1 for the fact that the optical element 10 has, along the axis X-X and on the side opposite the first body portion 11 (not visible in the figure), a counterweight element 70 which acts as a balancer element of the device with respect to the axis X-X. The counterweight element 70 is extended on the side opposite the second body portion 13 with respect to the axis X-X.

On the lower surface of the counterweight 70, the seat 42 for the magnet 41 is formed. The magnetization axis of the magnet 41 is parallel to the scanning plane and perpendicular to the axis X-X. The coil (not illustrated) is facing the magnet 41 and is arranged such that its magnetization axis is orthogonal to the scanning plane. Such solution allows advantageously attaining a greater balancing of the optical element, 10 and a more precise alignment with regard to the various, components of the device with such optical component 10.

The coil can be housed in a seat made in a support element analogous to the support plate 30. The ends 47 of the leaf spring 40 can be fixed (in a manner not shown) to static components which are entirely similar to the connection arms 36 which extend upward from the base plate 32 of the support element 31 of FIG. 1.

In a further embodiment of the device of the present invention, illustrated in FIGS. 27 and 28, use is not made of the light guide 6 since the emission source 3 is arranged so as to emit the light beam directly on the surface 12 of the body portion 11 of the optical element 10, without any deflection of the optical emission path between the emission source 3 and the optical element 10. In the illustrated example, the emission source 3 is adapted to be supported by the upper PCB 200 by means of leads 3a (as in the above-described embodiments) and is arranged in such a manner that the light beam emitted by the source 3 is substantially vertical. The optical element 10 is positioned with the body portion 11 above the body portion 13, i.e. in substantially upside down position with respect to that illustrated in FIGS. 1-4 and 7-10. The optical element 10 is rotatable around the axis X-X, which in the operating configuration of the device 1 herein illustrated, is substantially vertical and coincides with the optical axis of the light beam emitted by the emission source 3.

The body portion 15 is spatially arranged below the second body portion 13 in the operating configuration of the device 1 (FIG. 28) and defines a coupling portion of the optical element 10 to the anchoring structure 31, intended in turn to be fixed to the PCB 200 in an entirely analogous manner to that described above.

As is visible in FIG. 28, the body portion 15 of the optical element 10' has an end pin 160 having a central portion 17 of smaller section than that of the remaining portions of the end pin 160. The central portion 17 is adapted to be snap-inserted in the seat 32a formed in the anchoring structure.

The seat 32a in particular is defined by an opening formed in an annular element 320 which has, on opposite sides, the connection arms 36 to the PCB 200. In FIG. 28 the seat 32a is shown partially sectioned in order to make such opening visible.

The rotation sliding between the pin 160 and the seat 32a is facilitated by the presence of two rings 18, in Teflon or another material with a low friction coefficient, such as for example ceramic material, in order to reduce the friction and the wear between the two components to a minimum.

Also in this case, a plurality of damper elements 34 are provided in the seat 32a, which act as protection for the entire device in the case of strong vertical stresses. Alternatively, the seat 32a can be defined in a plastic or metal plate, moulded or sheared, which is snap-inserted in the annular element 320 of the anchoring structure 31 and which has the damper elements 34 incorporated in the same piece.

The resonant element here is composed of a spiral spring 40 which has one end fixed to the first body portion 11 of the optical element and a second end fixed to the barrel 5. In this case, as shown in FIG. 28, the barrel 5 has a tab 5a which extends cantilevered downward until it reaches the spring 40.

The oscillation motion is imparted by a permanent magnet 41 housed in a suitable seat 42 formed on a lateral surface of the second body portion 13 of the optical element 10 and with the magnetization axis directed towards the air gap of a coil 43 which is also intended to be fixed to the PCB 2 by means of its leads 43a.

Figure 29:
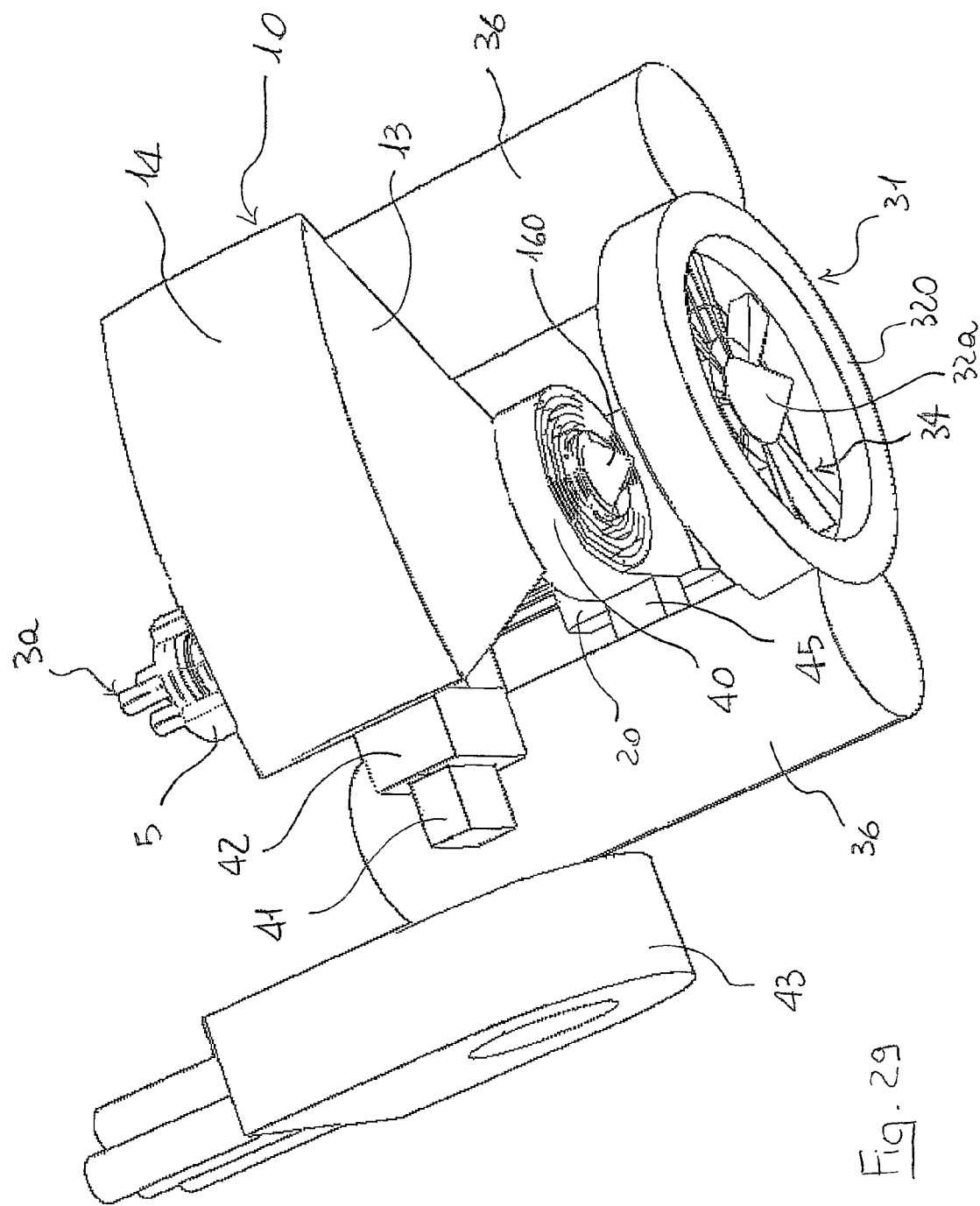
FIG. 29 is a perspective view of a portion of still another embodiment of the device of the present invention.

FIG. 29 shows an additional embodiment of the device of the present invention. Such embodiment differs from that of FIGS. 27 and 28 because the end pin 160 and the seat 32a have matching conical surfaces. The seat 32a, in particular, is coated with a low friction coefficient material, such as Teflon or ceramic material. The height extension of the conical surfaces of the pin 160 and seat 32a is such to be greater than the maximum vertical stroke foreseeable in case of mechanical shocks. In this manner, in case of shock, the pin 160 is either thrust downward against the seat 32a and dampened by the damper elements 34, or upward, separating itself from the seat 32a without however exiting outward from this.

Unlike that described with reference to FIGS. 27 and 28, the spiral spring 40 here is associated with the end pin 160 of the third body portion 15 of the optical element 10. The spring 40 in this case has one end associated with the pin 160 and the other end associated with the anchoring structure 31 by means of a coupling element 45, to which the spring 40 is fixed by means of fitting or pasting.

In all of the embodiments described above, all components of the scanning device of the invention are fixed to a single PCB, except for the light guide 6, in some embodiments of the device; these components can be made in opaque plastic (in the case of supports) or transparent plastic (in the case of collection elements). Any other mechanical support can therefore be eliminated, since the PCB itself constitutes the support of all components.

A device of such a structure is very well adapted to being integrated in an optical reader of manual type, but can advantageously be integrated in a reader of fixed type, especially of small size, thanks to its compactness.

What is claimed is:

1. A laser light beam scanning device for reading coded information, comprising:
    an emission source of a laser light beam, said emission source being fixedly supported inside the laser light beam scanning device;
    an optical element for scanning the laser light beam on a support containing coded information;
    an optical element for collecting the light coming from said support; and
    photodetector means sensitive to the light collected by said collecting optical element so as to generate a signal which is representative of the information contained in said support, said photodetector means being fixedly supported inside the laser light beam scanning device;
    wherein said collecting optical element comprises at least one transmissive input surface for the light coming from said support and wherein said scanning optical element and said collecting optical element are spatially distinct and integrally oscillating around an oscillation axis X-X, and
    wherein the scanning optical element is arranged along the oscillation axis X-X at a different position with respect to the collecting optical element.

2. The device according to claim 1, wherein said collecting optical element is a refractive or a diffractive element.

3. The device according to claim 1, wherein said collecting optical element does not have reflecting surfaces.

4. The device according to claim 1, wherein said collecting optical element and said scanning optical element are part of a single light scanning and collecting optical element which is rotatable around said oscillation axis X-X.

5. The device according to claim 4, wherein said single light scanning and collecting optical element comprises a body having a first body portion adapted to act on the light beam emitted by said emission source and shaped so to direct said light beam towards said support along an optical emission path, and at least one second body portion, spatially distinct from said first body portion, adapted to act on the light coming from said support and so shaped to collect said light on said photodetector means along an optical collection path.

6. The device according to claim 5, wherein said first body portion is extended coaxially with said axis X-X and comprises a first surface tilted at an angle different from 90° with respect to said oscillation axis X-X.

7. The device according to claim 6, wherein said first surface of said first body portion is a mirror-like surface.

8. The device according to claim 6, wherein said first surface of said first body portion is an internal surface of a prism working via total internal reflection defined in said first body portion.

9. The device according to claim 5, wherein said at least one second body portion defines, in said transmissive surface, a lens having a collecting face of the light diffused by said support and a focus close to one end of said at least one second body portion opposite said light collecting face.

10. The device according to claim 9, wherein said oscillation axis X-X crosses said at least one second body portion close to said end opposite said light collecting face.

11. The device according to claim 5, wherein said photodetector means are arranged along said optical collection path downstream of said at least one second body portion so that said optical collection path is substantially linear.

12. The device according to claim 5, wherein said at least one second body portion comprises a second surface tilted at an angle which is different from 90° with respect to said oscillation axis X-X and wherein said photodetector means are arranged along said optical collection path downstream of said at least one second body portion and on the side opposite said first body portion, so that said optical collection path comprises at least two sections which are tilted with respect to each other.

13. The device according to claim 4, comprising a structure for anchoring said single light scanning and collecting optical element to a PCB, wherein said single light scanning and collecting optical element comprises a third body portion extended coaxially with said oscillation axis X-X on the side opposite said first body portion with respect to said at least one second body portion and wherein said anchoring structure comprises a first support element associated with said single light scanning and collecting optical element at said first body portion and a second support element associated with said single scanning and light collecting optical element at said third body portion, said first and second support elements being reciprocally associated.

14. The device according to claim 13, wherein said first body portion is rotatably associated with said first support element and said third body portion is rotatably associated with said second support element.

15. The device according to claim 13, comprising damping means operatively interposed between said single light scanning and collecting optical element and said anchoring structure.

16. The device according to claim 4, further comprising a resonant element associated with said single light scanning and collecting optical element and excitation means of said resonant element.

17. The device according to claim 16, wherein said resonant element comprises two counteracting elastic elements.

18. The device according to claim 17, wherein said single light scanning and collecting optical element comprises a body having a first body portion adapted to act on the light beam emitted by said emission source and shaped so to direct said light beam towards said support along an optical emission path, and at least one second body portion, spatially distinct from said first body portion, adapted to act on the light coming from said support and so shaped to collect said light on said photodetector means along an optical collection path, wherein said permanent magnet is housed in a seat formed in said single light scanning and collecting optical element, and wherein said seat is arranged on the side opposite said at least one second body portion with respect to said oscillation axis X-X.

19. The device according to claim 16, wherein said resonant element comprises a planar spring, said excitation means comprise a permanent magnet and an electric winding and said permanent magnet is associated with said planar spring.

20. The device according to claim 16, comprising a counterweight element associated with said single light scanning and collecting optical element and extended on the side opposite said second body portion with respect to said oscillation axis X-X, wherein said excitation means comprises a permanent magnet and an electric winding and said permanent magnet is associated with said counterweight element.

21. The device according to claim 16, wherein said excitation means comprise a permanent magnet and an electric winding, and wherein said resonant element comprises a plate having a first end associated with said single light scanning and collecting optical element and a second end associated with an anchoring structure of said single light scanning and collecting optical element.

22. The device according to claim 21, wherein said single light scanning and collecting optical element comprises a body having a first body portion adapted to act on the light beam emitted by said emission source and shaped so to direct said light beam towards said support along an optical emission path, and at least one second body portion, spatially distinct from said first body portion, adapted to act on the light coming from said support and so shaped to collect said light on said photodetector means along an optical collection path, wherein said permanent magnet is housed in a seat formed in said single light scanning and collecting optical element, and wherein said seat is arranged on the side opposite said at least one second body portion with respect to said oscillation axis X-X.

23. The device according to claim 21, wherein said permanent magnet is associated with a PCB, said electric winding is associated with said single light scanning and collecting optical element and said resonant element is a planar spring comprising two elements which are electrically isolated from each other and synchronously oscillating.

24. The device according to claim 4, further comprising a light guide operatively interposed between said emission source and said single light scanning and collecting optical element.

25. The device according to claim 4, further comprising a beam concentrator element operatively interposed between said single light scanning and collecting optical element and said photodetector means.

26. An optical reader of coded information, comprising a scanning device according to claim 1.

* * * * *